United States Patent
Jin et al.

(10) Patent No.: US 8,891,501 B2
(45) Date of Patent: Nov. 18, 2014

(54) METHOD, APPARATUS, AND SYSTEM FOR ROUTING USER PLANE DATA IN MOBILE NETWORK

(75) Inventors: Weisheng Jin, Shanghai (CN); Wenruo Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 364 days.

(21) Appl. No.: 13/345,140

(22) Filed: Jan. 6, 2012

(65) Prior Publication Data

US 2012/0106456 A1    May 3, 2012

Related U.S. Application Data

(63) Continuation of application No. PCT/CN2010/075054, filed on Jul. 8, 2010.

(30) Foreign Application Priority Data

Jul. 8, 2009    (CN) .......................... 2009 1 0140289

(51) Int. Cl.
  *H04W 4/00*    (2009.01)
  *H04W 76/02*    (2009.01)
  *H04W 84/04*    (2009.01)
  *H04W 40/24*    (2009.01)

(52) U.S. Cl.
  CPC .......... *H04W 76/022* (2013.01); *H04W 84/045* (2013.01); *H04W 40/24* (2013.01)
  USPC .......................................... 370/338; 370/401

(58) Field of Classification Search
  USPC ................... 370/328, 338, 401, 465
  See application file for complete search history.

(56) References Cited

U.S. PATENT DOCUMENTS 7,940,697 B2 *  5/2011  Savolainen et al. ........... 370/254
7,974,228 B2 *  7/2011  Bosch et al. .................. 370/315

(Continued)

FOREIGN PATENT DOCUMENTS

| CN | 1859614 A | 11/2006 |
|---|---|---|
| CN | 101330425 A | 12/2008 |
| CN | 101360094 A | 2/2009 |
| WO | WO 2008/080717 A1 | 7/2008 |

OTHER PUBLICATIONS

Office Action issued in corresponding Chinese Patent Application No. 200910140289.6, mailed May 3, 2012.

(Continued)

*Primary Examiner* — Ricky Ngo
*Assistant Examiner* — Christine Ng
(74) *Attorney, Agent, or Firm* — Brinks Gilson & Lione

(57) ABSTRACT

A method, an apparatus, and a system for routing user plane data in a mobile network are disclosed in the embodiments of the present invention, relate to the field of communications, and solve the problem that transmission delay of packet service data is relatively great in the prior art. The method for routing user plane data in the mobile network includes that: an access network bearer and a PDN gateway bearer of a user equipment are directly interconnected through a tunnel established between an access network and a PDN gateway; and data between a Home NodeB, a Home NodeB Gateway or a macro network access network and the PDN gateway is directly routed through the tunnel. The method, the apparatus, and the system can be applied to a mobile communication system.

7 Claims, 16 Drawing Sheets

---

Directly interconnect an access network bearer and a PDN gateway bearer of a user equipment through a tunnel established between an access network and a PDN gateway — 101

Directly route data between a Home NodeB, a Home NodeB gatway or a macro network access network and a PDN gateway through the tunnel — 102

(56) References Cited

U.S. PATENT DOCUMENTS

| | | | |
|---|---|---|---|
| 8,457,635 B2* | 6/2013 | Bachmann et al. | 455/436 |
| 8,566,455 B1* | 10/2013 | Zhao et al. | 709/227 |
| 8,577,363 B2* | 11/2013 | Wijting et al. | 455/426.1 |
| 2002/0073222 A1* | 6/2002 | Sonoda et al. | 709/232 |
| 2007/0258427 A1 | 11/2007 | Shaheen et al. | |
| 2008/0165725 A1 | 7/2008 | Huomo et al. | |
| 2008/0254768 A1* | 10/2008 | Faccin | 455/411 |
| 2010/0150049 A1* | 6/2010 | Kim et al. | 370/312 |
| 2010/0238887 A1* | 9/2010 | Koodli et al. | 370/329 |

OTHER PUBLICATIONS

Extended European Search Report issued in corresponding European Patent Application No. 10796731.7, mailed Apr. 12, 2012.

International Search Report and Written Opinion of the International Searching Authority issued in corresponding PCT Patent Application No. PCT/CN2010/075054, mailed Oct. 28, 2010.

NEC, "Architecture Alternative for Local IP Access" Agenda Item 7.4.6, SA WG2 Temporary Document, 3GPP TSG SA WG2 Meeting #72. Hangzhou, China, Mar. 30-Apr. 3, 2009. TD S2-091989.

Samsung, "Open Issues and Solution for LIPA Service" Agenda Item 9.1, 3GPP TSG SA WG2 Meeting #73. Sophia-Antipolis, France, Jul. 6-10, 2009. TD S2-094346.

LTE, "$3^{rd}$ Generation Partnership Project; Technical Specification Group Services and System Aspects; Direct Tunnel Deployment Guideline" (Release 8) 3GPP TR 23.919. V8.0.0, Dec. 2008.

LTE, "$3^{rd}$ Generation Partnership Project; Technical Specification Group Services and System Aspects; General Packet Radio Service (GPRS) Enhancements for Evolved Universal Terrestrial Radio Access Network (E-UTRAN) Access" (Release 9) 3GPP TS 23.401. V9.1.0, Jun. 2009.

Office Action issued in corresponding Japanese Patent Application No. 2012-518744, mailed Jun. 4, 2013, 4 pages.

Huawei, Ericsson, "Discussion on U-Plane handling for home eNB" Agenda Item 10.1.2d, 3GPP TSG RAN WG3 Meeting #60. Kansas City, Missouri, US, May 5-9, 2008, 3 pages.

Huawei, "Support for CSG based charging" Change Request, 23.060 CR 0896, ver. 9.1.1, 3GPP TSG-SA2 Meeting #74. Sophia Antipolis, France, Jul. 6-10, 2009, 4 pages.

Huawei, Ericsson, "Discussion on U-Plane handling for home eNB" Agenda Item 10.1.2d, 3GPP TSG RAN WG3 Meeting #61. Jeju Island, Korea, Aug. 18-22, 2008, 3 pages.

Ericsson, ST-Ericsson, "Clarification about 3GDT for Home NB subsystem" Change Request 23.002 CR 0206, ver. 9.0.0, 3GPP TSG-SA WG2 Meeting #74. Sophia Antipolis, France, Jul. 6-10, 2009, 2 pages.

* cited by examiner

METHOD, APPARATUS, AND SYSTEM FOR ROUTING USER PLANE DATA IN MOBILE NETWORK

CROSS-REFERENCE TO RELATED APPLICATIONS

This application is a continuation of International Application No. PCT/CN2010/075054, filed on Jul. 8, 2010, which claims priority to Chinese Patent Application No. 200910140289.6, filed on Jul. 8, 2009, both of which are hereby incorporated by reference in their entireties.

FIELD OF THE INVENTION

The present invention relates to the field of communications, and in particular, to a method, an apparatus, and a system for routing user plane data in a mobile network.

BACKGROUND OF THE INVENTION

After a user equipment (User Equipment, UE) gets access to a NodeB, the NodeB transmits packet service data sent by the UE to an access network through a Mobile backhaul, the access network converges the packet service data, then the access network transmits the packet service data to a Serving Gateway (Serving Gateway, SGW) through a tunnel established in a GPRS Tunneling Protocol-User plane (GPRS Tunneling Protocol-User plane GPRS, GTPU) manner, then the packet service data is transmitted to a public data network (Public Data Network, P DN) from an IP backbone (IP backbone) network and a PDN gateway (PDN Gateway, PGW), and a packet service server in the PDN serves the user equipment.

In order to satisfy personalized needs of different user groups, a Home NodeB emerges. The Home NodeB is a type of NodeB, deployed at sites such as a home, a community, a company or a school as an exclusive resource, and generally integrated on an access network. A user equipment in the Home NodeB sends packet service data to the Home NodeB, and transmits the packet service data to the PDN through a tunnel between the access network and the SGW.

For a conventional 3G core network, after the user equipment is switched into an idle state, and if downlink data arrives, a GGSN sends the downlink data to a SGSN, and the SGSN buffers the data; when the user equipment is recovered into a connection state, the SGSN delivers the buffered data to an access network. For an evolved packet core network, after the user equipment is switched into an idle state, and if downlink data arrives, the PGW sends the downlink data to the SGW, and the SGW buffers the downlink data; when the UE is recovered into a connection state, the SGW delivers the buffered data to an access network.

In the prior art, at least the following problems exist that: the access network transmits the packet service data to the SGW through the tunnel, then the SGW transmits the packet service data to the PDN through the IP backbone network and the PGW, the packet service data passes through many network entities in the transmission process, so that transmission delay of the packet service data is great, and routing is not optimized sufficiently.

SUMMARY OF THE INVENTION

Embodiments of the present invention provide a method, an apparatus, and a system for routing user plane data in a mobile network, which can reduce transmission delay of packet service data.

For the above purpose, the following technical solutions are adopted in the embodiments of the present invention.

A method for routing user plane data in a mobile network includes:

directly interconnecting an access network bearer and a PDN Gateway bearer of a user equipment through a tunnel established between an access network and a PDN Gateway; and directly routing data between a Home NodeB, a Home NodeB Gateway or a macro network access network and a PDN gateway through the tunnel.

An apparatus for routing user plane data in a mobile network includes:

an establishing module, configured to directly interconnect an access network bearer of a user equipment and a PDN gateway bearer of a user equipment through a tunnel established between an access network and a PDN gateway; and a routing module, configured to directly route data between an Home NodeB, an Home NodeB gateway or a macro network access network and a PDN gateway through the tunnel established by the establishing module.

An embodiment of the present invention further provides a communication system, including an access network and a PDN gateway, where an access network bearer and a PDN gateway bearer of a UE are directly interconnected through a tunnel established between the access network and the PDN gateway, and data between the access network and the PDN gateway is directly routed through the tunnel.

A communication system includes: a PDN gateway integrated in an access network and an Home NodeB gateway, where the Home NodeB gateway is configured to, when a mobile network core network is an evolved core network, obtain a management message carrying a core network control plane address sent by an SGW when a mobile network core network is an evolved core network, convert the core network control plane address in the management message into an access network control plane address, and send the management message with the control plane address replaced to the PDN gateway; and/or, obtain a management message carrying the access network control plane address sent by the PDN gateway, convert the access network control plane address in the management message into the core network control plane address, and send the management message with the control plane address replaced to the SGW; and when a core network of the mobile network is a conventional 3G core network, the Home NodeB gateway obtains a management message carrying a core network control plane address sent by the SGSN, converts the core network control plane address in the management message into an access network control plane address, and sends the management message with the control plane address replaced to the PDN gateway; and/or, obtains a management message carrying the access network control plane address sent by the PDN gateway, converts the access network control plane address in the management message into the core network control plane address, and sends the management message with the control plane address replaced to the SGSN.

In the method, the apparatus, and the system for routing the user plane data in the mobile network according to the embodiments of the present invention, the data is directly routed between a Home NodeB, a Home NodeB gateway or a macro network access network and a PDN gateway through a tunnel between the access network and the PDN gateway, which shortens the transmission delay of data and ensures the Quality of Service of transmission.

BRIEF DESCRIPTION OF THE DRAWINGS

To illustrate the technical solutions in the embodiments of the present invention or in the prior art more clearly, accompanying drawings to be used in the description of the embodiments of the present invention or the prior art are introduced briefly below. Apparently, the accompanying drawings are only some embodiments of the present invention, and person having ordinary skill in the art may derive other drawings from these accompanying drawings without any creative effort.

DETAILED DESCRIPTION OF THE EMBODIMENTS

Figure 1:
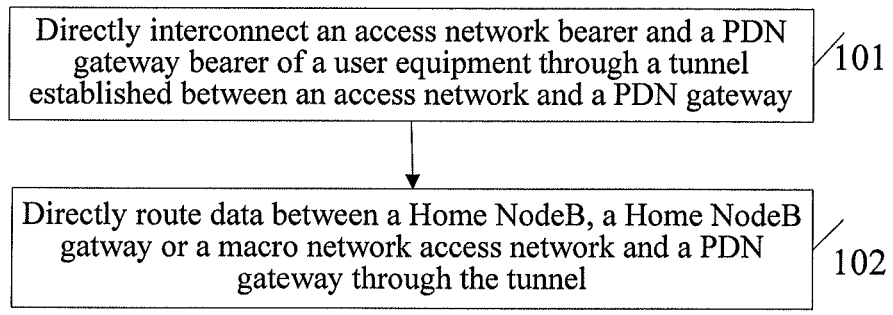
FIG. 1 is a flow chart of a method for routing user plane data in a mobile network according to an embodiment of the present invention.

The technical solutions in the embodiments of the present invention are described in detail below, with reference to the accompanying drawings in the embodiments of the present invention. However, the embodiments to be described are only part of, rather than all of, the embodiments of the present invention. Other embodiments that persons having ordinary skill in the art derive based on the embodiments of the present invention and without making any creative effort, shall all fall within the protection scope of the present invention.

In an embodiment, a method for routing user plane data in a mobile network includes that:

an access network bearer of a user equipment and a PDN gateway bearer of the user equipment are directly interconnected through a tunnel established between an access network and a PDN gateway; and data between a Home NodeB, a Home NodeB gateway or a macro network access network and a PDN gateway is directly routed through the tunnel.

When the mobile network core network is an evolved core network, the method further includes that:

the access network receives a management message from a serving gateway, SGW, where the management message carries a tunnel endpoint identifier of the PDN gateway, and manages an uplink tunnel corresponding to the tunnel endpoint identifier of the PDN gateway according to the tunnel endpoint identifier of the PDN gateway; and/or the PDN gateway receives the management message from the SGW, where the management message carries a tunnel endpoint identifier of the access network, and manages a downlink tunnel corresponding to the tunnel endpoint identifier of the access network according to the tunnel endpoint identifier of the access network.

When the management message is an establishment message, the managing the uplink tunnel corresponding to the tunnel endpoint identifier of the PDN gateway according to the tunnel endpoint identifier of the PDN gateway includes that:

an uplink tunnel corresponding to the tunnel endpoint identifier of the PDN gateway is established according to the tunnel endpoint identifier of the PDN gateway, so that the access network bearer of the user equipment and the PDN gateway bearer of the user equipment are directly interconnected; and/or the managing the downlink tunnel corresponding to the tunnel endpoint identifier of the access network according to the tunnel endpoint identifier of the access network specifically includes that:

a downlink tunnel corresponding to the tunnel endpoint identifier of the access network is established according to the tunnel endpoint identifier of the PDN gateway, so that the access network bearer of the user equipment and the PDN gateway bearer of the user equipment are directly interconnected.

When the management message is a bearer update message, the managing the uplink tunnel corresponding to the tunnel endpoint identifier of the PDN gateway according to the tunnel endpoint identifier of the PDN gateway includes that:

the uplink tunnel corresponding to the tunnel endpoint identifier of the PDN gateway is updated according to the tunnel endpoint identifier of the PDN gateway; and/or the managing the downlink tunnel corresponding to the tunnel endpoint identifier of the access network according to the tunnel endpoint identifier of the access network includes that:

the downlink tunnel corresponding to the tunnel endpoint identifier of the access network is updated according to the tunnel endpoint identifier of the access network.

When the tunnel endpoint identifier in the management message is the tunnel endpoint identifier of the PDN gateway, the management message further includes a user plane uplink address of the PDN gateway, so that the access network manages the uplink tunnel corresponding to the user plane uplink address and the tunnel endpoint identifier according to the user plane uplink address and the tunnel endpoint identifier of the PDN gateway in the management message.

When the tunnel endpoint identifier in the management message is the tunnel endpoint identifier of the access network, the management message further includes a user plane downlink address of the access network, so that the PDN gateway manages the downlink tunnel corresponding to the user plane downlink address and the tunnel endpoint identifier according to the user plane uplink address and the tunnel endpoint identifier of the access network in the management message.

The method further includes that:

the SGW obtains access network unload enabling information;

the SGW determines, according to the access network unload enabling information, whether to enable an access network unload function;

in an uplink tunnel management process, if the access network unload function is enabled, the SGW sends a management message carrying a tunnel endpoint identifier of the PDN gateway to the access network; and if the access network unload function is not enabled, sends a management message carrying a tunnel endpoint identifier of the SGW to the access network; and/or in a downlink tunnel management process, if the access network unload function is enabled, the SGW sends a management message carrying a tunnel endpoint identifier of the access network to the PDN gateway; and if the access network unload function is not enabled, sends a management message carrying a tunnel endpoint identifier of the SGW to the PDN gateway.

The obtaining, by the SGW, the access network unload enabling information includes that:

the SGW receives the access network unload enabling information sent by a network side.

The access network unload enabling information is indication information, position information or Quality of Service negotiation information unloaded by the access network, and is configured to indicate whether the SGW enables the access network unload function.

When the access network and the PDN gateway are integrated together, the access network receives a management message carrying an identifier of the user equipment, determines a unique identifier of the access network bearer corresponding to the identifier of the user equipment according to the identifier of the user equipment, and manages an uplink tunnel corresponding to the identifier of the access network bearer; and/or, the PDN gateway receives a management message carrying an identifier of the user equipment, determines an unique identifier of a core network bearer corresponding to the identifier of the user equipment according to the identifier of the user equipment, and manages a downlink tunnel corresponding to the identifier of the core network bearer.

When the core network of the mobile network is an evolved core network, the management message received by the access network is sent through an SGSN or a MME by the PDN gateway; and/or, the management message received by the PDN gateway is sent to the SGW through the SGSN or sent to the SGW through the MME by the access network.

When the core network of the mobile network is a conventional 3G core network, the management message received by the access network is sent by the SGSN; and/or, the management message received by the PDN gateway is sent by the SGSN.

When the management message is a bearer establishment message, the managing the corresponding uplink tunnel includes that:

an uplink tunnel corresponding to the unique identifier of the access network bearer is established, and the uplink tunnel is deployed between the access network and the PDN gateway of the user equipment, so that the access network bearer and the PDN gateway bearer are directly interconnected; and/or the managing the downlink tunnel corresponding to the identifier of the core network bearer includes that:

a downlink tunnel corresponding to the unique identifier of the data network bearer is established, and the downlink tunnel is deployed between the access network and the PDN gateway of the user equipment, so that the access network bearer of the user equipment and the PDN gateway bearer of the user equipment are directly interconnected.

When the management message is a bearer update message, the managing the uplink tunnel corresponding to the identifier of the access network bearer includes that:

an uplink tunnel corresponding to the identifier of the access network bearer is updated, and the downlink tunnel is deployed between the access network and the PDN gateway of the user equipment; and/or the managing the downlink tunnel corresponding to the identifier of the core network bearer includes that:

A downlink tunnel corresponding to the identifier of the core network bearer is updated, and the downlink tunnel is deployed between the access network and the PDN gateway of the user equipment.

The identifier of the user equipment in the management message is an IMSI, an MSISDN, a P-TMSI, an S-TMSI or a temporary identifier of the user equipment allocated by an MME or an SGSN.

The method further includes that:

the identifier of the user equipment is obtained by receiving an access network control plane message carrying the identifier of the user equipment and the access network control plane message is an INITIAL CONTEXT SETUP REQUEST, an E-RAB SETUP REQUEST, an E-RAB MODIFY REQUEST or an RAB ASSIGNMENT REQUEST.

Before the access network manages the uplink tunnel, the method further includes that:

the PDN gateway sends trigger paging indication information, where the trigger paging indication information indicates that downlink data is provided, so that the SGW or the SGSN sends a paging message to the UE according to the trigger paging indication information, and instructs the UE to initiate the uplink tunnel management procedure.

Before the PDN gateway sends the trigger paging indication information, the method further includes that:

the PDN gateway receives data buffer enabling information sent by the network side, determines, according to the data buffer enabling information, whether to buffer the downlink data, and buffers the downlink data when determining to buffer the downlink data; or when the access network and the PDN gateway are integrated together, the PDN gateway obtains a connection state of the tunnel, determines, according to the connection state, whether to buffer the downlink data, and buffers the downlink data when determining to buffer downlink data.

The trigger paging indication information is at least one data packet in the downlink data.

The trigger paging indication information is a downlink data notification or an empty packet carrying discard indication information.

When a core network of the mobile network is an evolved core network, the Home NodeB gateway obtains a management message that carries a core network control plane address and is sent by the SGW, converts the core network control plane address in the management message into an access network control plane address, and sends the management message with the control plane address replaced to the PDN gateway; and/or, obtains a management message that carries the access network control plane address and is sent by the PDN gateway, converts the access network control plane address in the management message into the core network control plane address, and sends the management message with the control plane address replaced to the SGW.

When the mobile network core network is a conventional 3G core network, the Home NodeB gateway obtains a management message that carries a core network control plane address and is sent by the SGSN, converts the core network control plane address in the management message into an access network control plane address, and sends the management message with the control plane address replaced to the PDN gateway; and/or, obtains a management message that carries the access network control plane address and is sent by the PDN gateway, converts the access network control plane address in the management message into the core network control plane address, and sends the management message with the control plane address replaced to the SGSN.

The present invention is further explained below with reference to specific embodiments and accompanying drawings.

As shown in FIG. 1, an embodiment of the present invention provides a method for routing user plane data in a mobile network, which includes:

In step 101, an access network bearer of a user equipment and a PDN gateway bearer of the user equipment are directly interconnected through a tunnel established between an access network and a PDN gateway.

In step 102, data between a Home NodeB, a Home NodeB gateway or a macro network access network and a PDN gateway is directly routed.

In the method for routing the user plane data in the mobile network according to the embodiments of the present invention, the data is directly routed between the Home NodeB, the Home NodeB gateway or the macro network access network and the PDN gateway through the tunnel between the access network and the PDN gateway, which shortens the transmission delay of data and ensures the Quality of Service of transmission.

In order to make persons skilled in the art understand more clearly the technical solutions according to the embodiments of the present invention, the embodiments of the present invention is further introduced below.

Before the specific embodiments are described, firstly different network architectures in the prior art are simply introduced.

Figure 2:
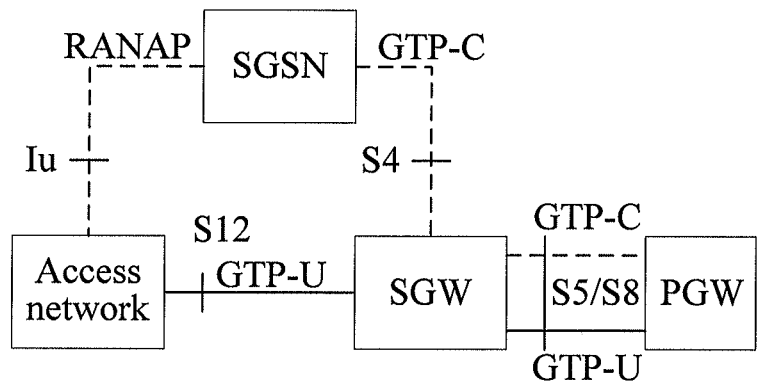
FIG. 2 is a schematic diagram of a network architecture in which a 2G/3G access network get access to an EPC core network according to an embodiment of the present invention.
Figure 3:
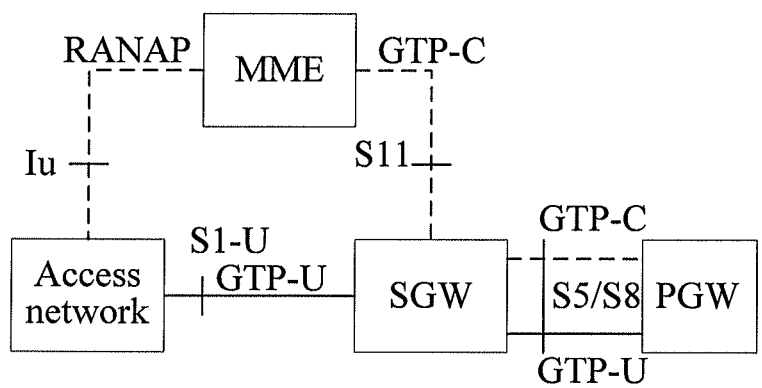
FIG. 3 is a schematic diagram of a network architecture in which an LTE access network get access to an EPC core network according to an embodiment of the present invention.

A 2G/3G access network get access to a conventional 3G core network, and when the Direct Tunnel technology is used, the SGSN is located between the access network and a GGSN, and is responsible for mobility management and bearer management. As shown in FIG. 2, which is a schematic diagram of a network architecture in which a 2G/3G access network get access to an EPC core network, an SGSN (serving GPRS support node) is located between the access network and a serving gateway, and is responsible for mobility management and bearer management. FIG. 3 shows that an LTE access network get access to an EPC core network, which is different from the network architecture where the 2G/3G access network is accessed to the EPC core network in that an MME (mobility management entity) is located between the access network and a serving gateway, and is responsible for mobility management and bearer management. Both the SGSN and the MME here are core network control plane function entities. In the embodiment, the architecture and the procedure of the 2G/3G access network getting access to the EPC core network is basically consistent with those of the LTE access network getting access to the EPC core network, and the present invention is mostly illustrated with the 2G/3G access network getting access to the EPC core network, which is similar to a case of the LTE access network.

Embodiment 1

Figure 4:
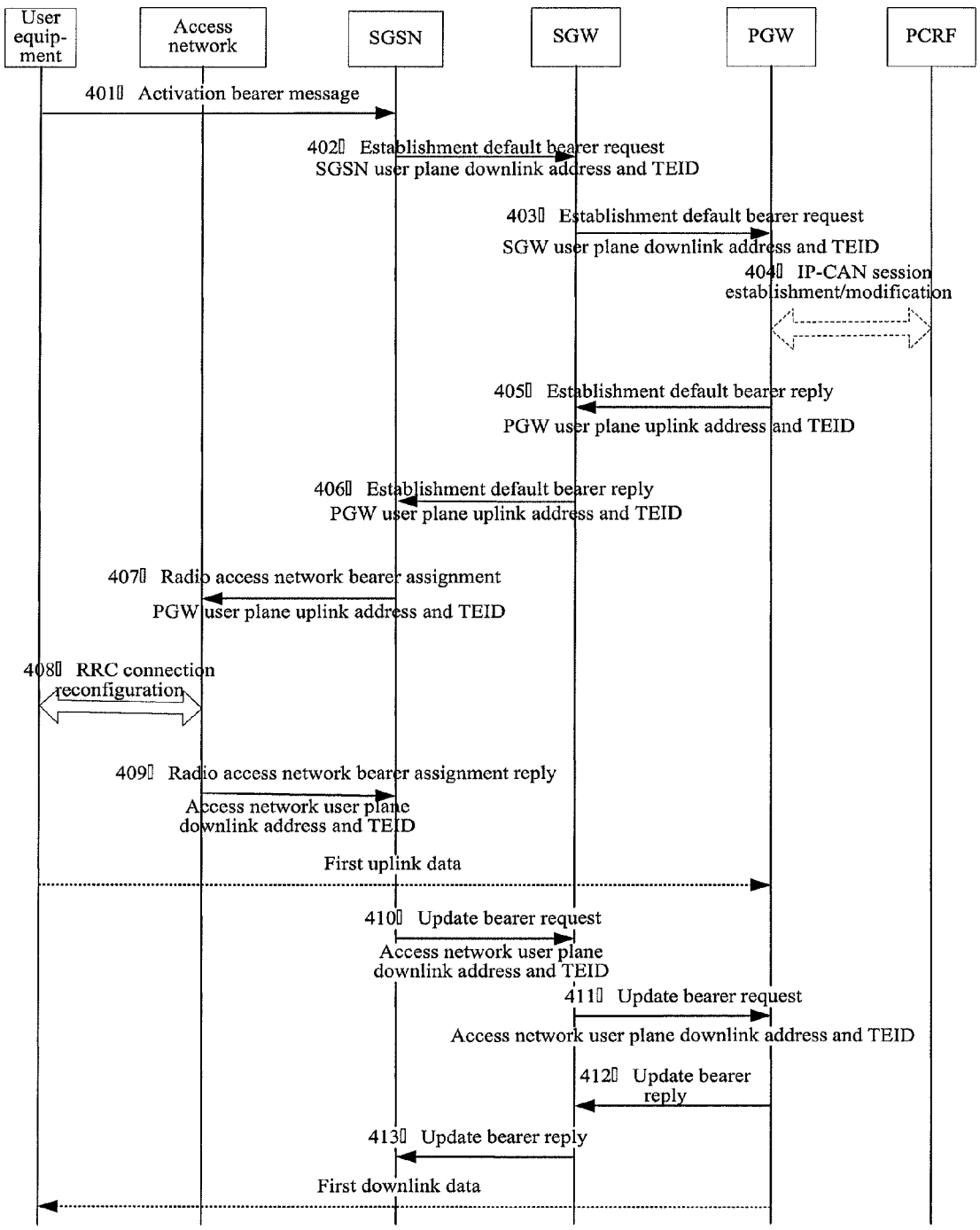
FIG. 4 is a flow chart of a method for routing user plane data in a mobile network according to Embodiment 1.

In this embodiment, a user equipment requesting to establish a first radio access network bearer is illustrated as an example, as shown in FIG. 4.

In step 401, a user equipment sends an activation bearer message to an SGSN, where the activation bearer message may carry a special APN, and when an access network sends the message to the SGSN, the message may carry an indication about whether the access network supports user plane direct routing, so that the SGSN determines, according to such factors as an APN, a policy, user subscription, and whether the access network supports the user plane direct routing, whether to initiate the user plane direct routing, and unloads user data from an access network side.

In step 402, the SGSN sends an establishment default bearer request to an SGW according to the activation bearer message, where the default bearer request is a first radio access network bearer established in a process that the user equipment establishes a radio access network bearer. The default bearer request may carry a local unload indication, and the unload indication carries a user plane downlink address and a TEID (tunnel endpoint identifier) corresponding to the user equipment at the SGSN.

In step 403, the SGW sends the establishment default bearer request to a PGW, and the unload indication carries a user plane downlink address and a TEID corresponding to the user equipment at the SGW.

In step 404, optionally, the PGW may interact with a PCRF, so as to perform IP-CAN session establishment or modification.

In step 405, the PGW sends an establishment default bearer reply to the SGW, and the default bearer reply carries a user plane uplink address and a TEID corresponding to the user equipment at the PGW.

In step 406, according to the unload indication in step 402, the SGW replaces the user plane uplink address and the TEID allocated for the user equipment locally with the user plane uplink address and the TEID corresponding to the user equipment at the PGW, and sends the establishment default bearer reply with the user plane uplink address and the TEID replaced to the SGSN.

In step 407, the SGSN sends a radio access network bearer assignment request to the access network, where the radio access network bearer assignment request carries the user plane uplink address and the TEID corresponding to the user equipment at the PGW.

In step 408, an RRC connection between the user equipment and the access network is reconfigured.

In step 409, the access network sends a radio access network bearer assignment reply to the SGSN, where the radio access network bearer assignment reply carries the user plane downlink address and the TEID corresponding to the user equipment at the access network.

After execution of step 409 is completed, the user equipment may send first uplink data through the radio access network bearer.

In step 410, the SGSN sends a bearer updating request to the SGW, where the bearer updating request carries a user plane downlink address and a TEID corresponding to the user equipment at the access network.

In step 411, according to the unload indication in step 402, the SGW replaces the user plane downlink address and the TEID which should be allocated for the user equipment locally with the user plane downlink address and the TEID corresponding to the user equipment at the access network, and sends the bearer updating request with the user plane downlink address and the TEID replaced to the PGW.

In step 412, the PGW sends a bearer updating reply to the SGW.

In step 413, the SGW sends the bearer updating reply to the SGSN.

After execution of step 413 is completed, the user equipment may send first downlink data through the radio access network bearer.

The procedure is similar to that in an EUTRAN system, and the difference lies in that, in step 401, the user equipment sends a PDN connection request to the MME.

Accordingly, in step 407, the MME sends a carrying PDN connection acceptance to the access network.

In step 408, the access network sends the carrying PDN connection acceptance to the user equipment.

In step 409, the user equipment notifies the MME of completion of the PDN connection.

In the method for routing the user plane data in the mobile network according to this embodiment, the data is directly routed between a Home NodeB, a Home NodeB gateway or a macro network access network and a PDN gateway through a tunnel between the access network and the PDN gateway, which shortens the transmission delay of data and ensures the Quality of Service of transmission.

Embodiment 2

Figure 5:
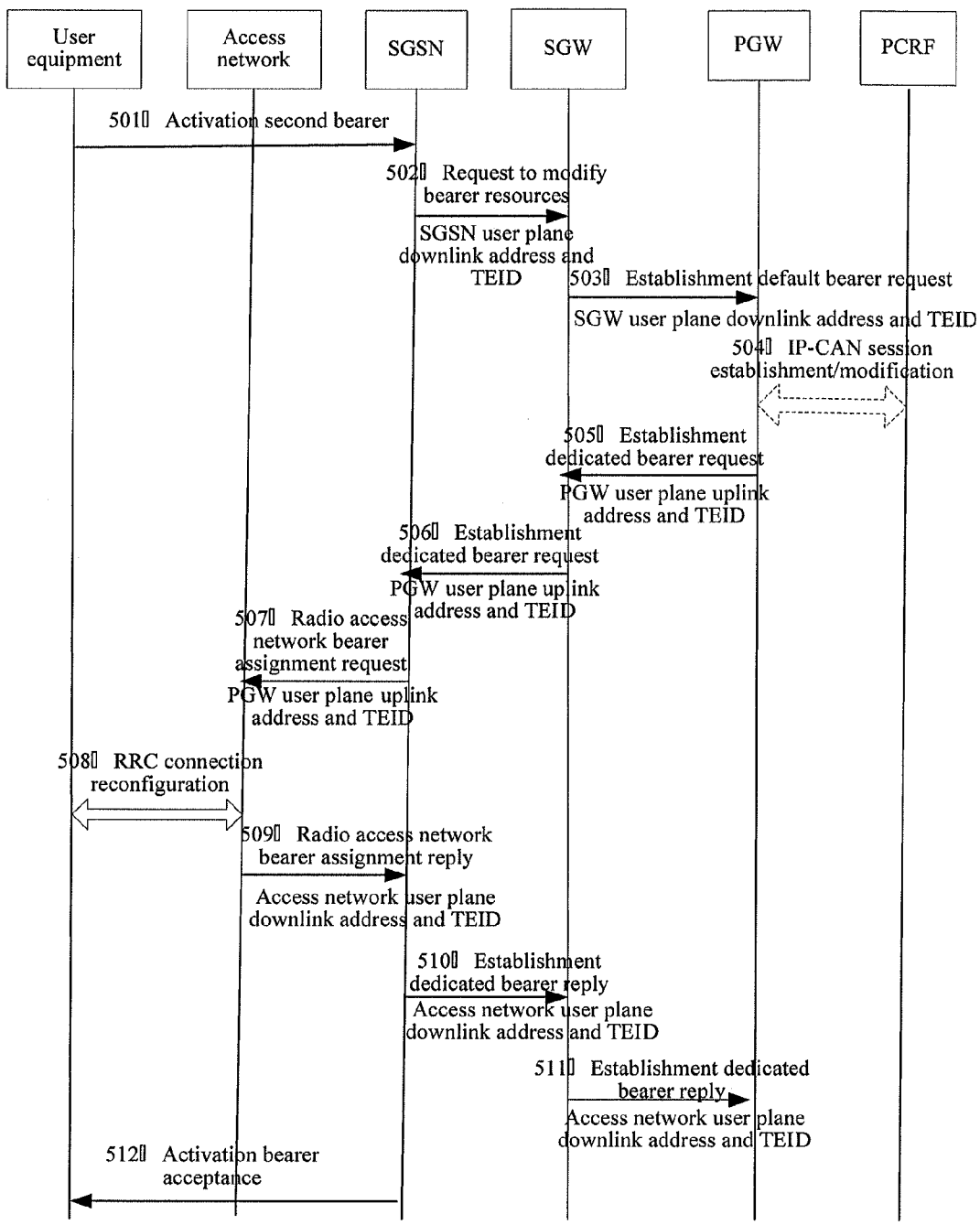
FIG. 5 is a flow chart of a method for routing user plane data in a mobile network according to Embodiment 2.

The difference between this embodiment and the foregoing embodiment lies in that, a user equipment requesting to establish a second radio access network bearer is illustrated as an example, as shown in FIG. 5.

In step 501, a user equipment sends an second bearer activating request to an SGSN.

In step 502, the SGSN receives the second bearer request, and sends a bearer modification request to an SGW.

In step 503, the SGW sends the bearer modification request to a PGW, and the bearer modification request carries a user plane downlink address and a TEID corresponding to the user equipment at the SGW.

In step 504, optionally, the PGW may interact with a PCRF, so as to perform IP-CAN session establishment/modification.

In step 505, the PGW sends an dedicated bearer setup request to the SGW, where the dedicated bearer request carries a user plane uplink address and a TEID corresponding to the user equipment at the PGW.

In this embodiment, other radio the access network bearers except the first radio access network bearer are referred to as dedicated bearers.

In step 506, the SGW determines a PDN connection of the dedicated bearer according to an IMSI and an LBI (Linked EPS Bearer ID) carried by the dedicated bearer setup request, and determines whether, according to an unload indication in an SGW bearer context, to initiate the access network unload function for the user equipment. If the unload indication is to initiate the access network unload function, the SGW replaces the user plane uplink address and the TEID allocated for the user equipment locally with the user plane uplink address and the TEID corresponding to the user equipment at the PGW, and sends the dedicated bearer setup request with the user plane uplink address and the TEID replaced to the SGSN.

In step 507, the SGSN sends a radio access network bearer assignment request to the access network, where the radio access network bearer assignment request carries the user plane uplink address and the TEID corresponding to the user equipment at the PGW.

In step 508, an RRC connection between the user equipment and the access network is reconfigured.

In step 509, the access network sends a radio access network bearer assignment reply to the SGSN, where the radio access network bearer assignment reply carries the user plane downlink address and the TEID corresponding to the user equipment at the access network.

In step 510, the SGSN sends an dedicated bearer setup reply to the SGW, where the dedicated bearer reply carries a user plane downlink address and a TEID corresponding to the user equipment at the access network.

In step 511, the SGW determines, according to an unload indication in the SGW dedicated bearer context, whether to initiate the access network unload function. If the unload indication is to initiate the access network unload function, the SGW replaces the user plane downlink address and the TEID allocated for the user equipment locally with the user plane downlink address and the TEID corresponding to the user equipment at the access network in the dedicated bearer setup reply, and sends the dedicated bearer setup reply with the user plane downlink address and the TEID replaced to the PGW.

In step 512, the SGSN sends an activation second bearer acceptance to the UE.

In the method for routing the user plane data in the mobile network according to this embodiment, the data is directly routed between a Home NodeB, a Home NodeB gateway or a macro network access network and a PDN gateway through a tunnel between the access network and the PDN gateway, which shortens the transmission delay of data and ensures the Quality of Service of transmission.

Embodiment 3

Figure 6:
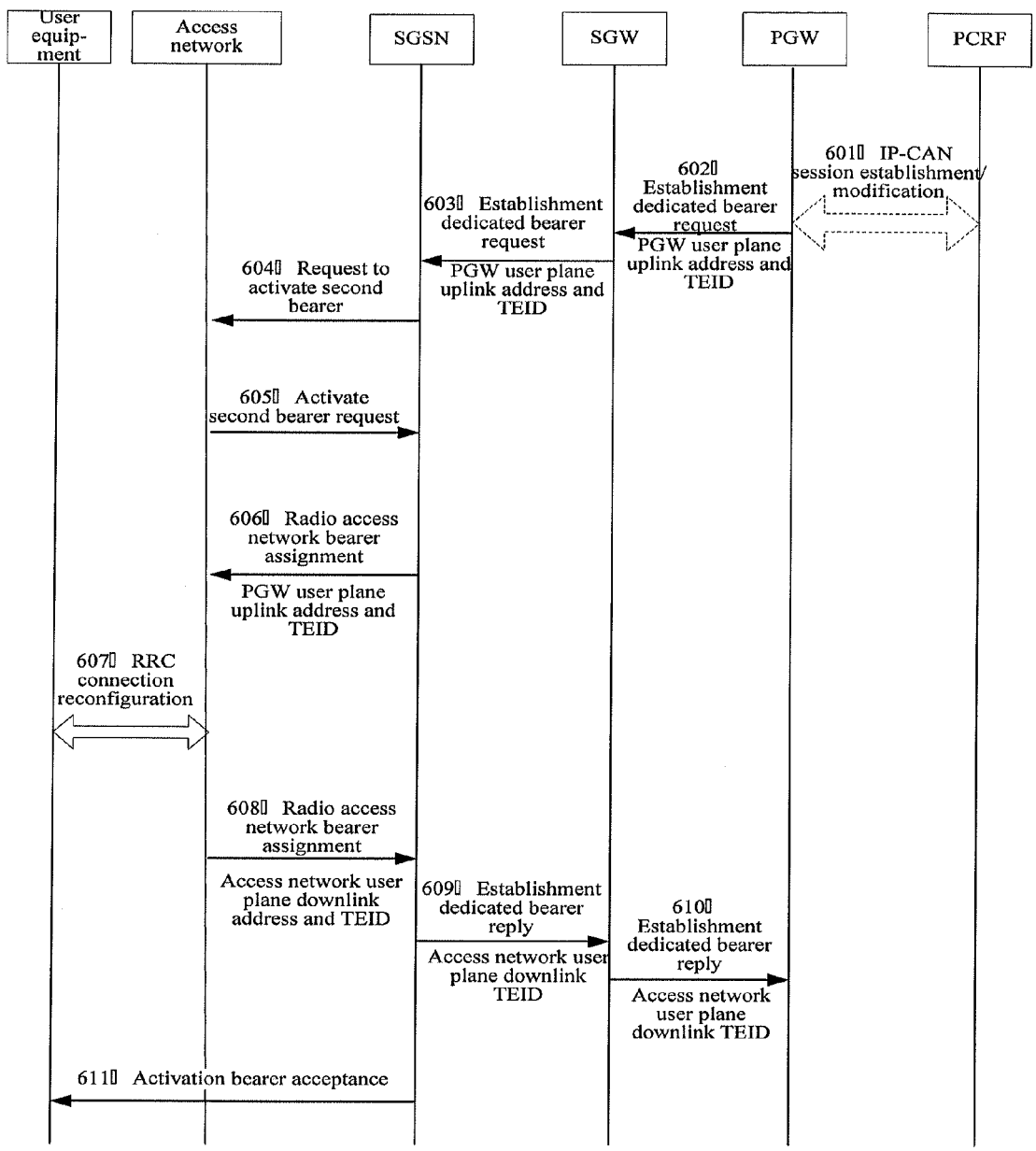
FIG. 6 is a flow chart of a method for routing user plane data in a mobile network according to Embodiment 3.

The difference between this embodiment and the foregoing embodiment lies in that, in this embodiment, a PGW requesting to establish a dedicated tunnel is illustrated as an example, as shown in FIG. 6. In step 602, the PGW initiates an dedicated bearer setup request to the SGW, where the dedicated bearer request carries a user plane uplink address and a TEID corresponding to the user equipment at the PGW.

Other procedures are similar to those in the foregoing embodiment, and are not repeated anymore herein.

In the method for routing the user plane data in the mobile network according to this embodiment, the data is directly routed between a Home NodeB, a Home NodeB gateway or a macro network access network and a PDN gateway through a tunnel between the access network and the PDN gateway, which shortens the transmission delay of data and ensures the Quality of Service of transmission.

Embodiment 4

Figure 7:
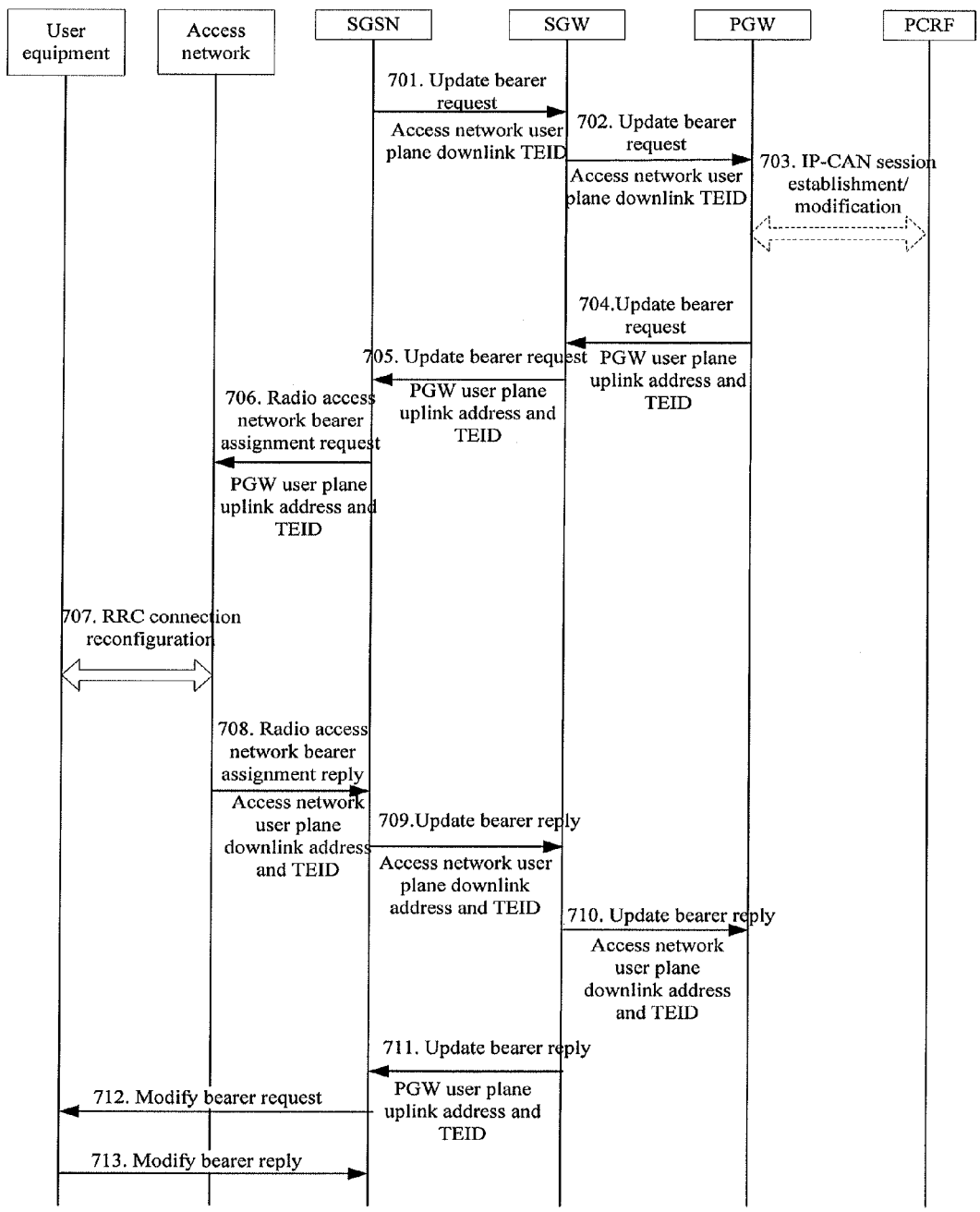
FIG. 7 is a flow chart of a method for routing user plane data in a mobile network according to Embodiment 4.

The difference between this embodiment and the foregoing embodiment lies in that, an SGSN modifying an established tunnel is illustrated as an example, as shown in FIG. 7, where the specific process is as follows.

In step 701, the SGSN sends an bearer updating request to an SGW, where the bearer updating request carries access network unload enabling information. The access network unload enabling information may be configured according to an operator policy or network setting or a change of the network configuration.

In step 702, if the access network unload enabling information indicates continuing to execute access network unload, the SGW replaces a user plane downlink address and a TEID allocated for a user equipment locally with a user plane downlink address and a TEID corresponding to the user equipment at the access network in the bearer updating request, sends the bearer updating request with the user plane downlink address and the TEID replaced to the POW; if the enabling information indicates disabling an access network unload function, the SGW sends the bearer updating request carrying the user plane downlink address and the TEID corresponding to the user equipment locally to the PGW.

In step 703, the PGW updates the user plane downlink address and the TEID in a local user equipment bearer context. Optionally, the PGW may interact with a PCRF, so as to perform IP-CAN session establishment/modification.

In step 704, the PGW sends a bearer updating request to the SGW, and the bearer updating request carries the user plane uplink address and the TEID of the PGW. The bearer updating request may further include an updated user plane uplink address.

In step 705, the SGW sends a bearer update request to the SGSN, and may carry the user plane uplink address of the PGW in the fourth step. If the access network unload enabling information indicates continuing to execute the access network unload, the SGW sends the bearer updating request to the SGSN and replaces the user plane uplink address and the TEID allocated locally with the user plane uplink address and the TEID corresponding to the user equipment at the access network in the bearer updating request; if the access network unload enabling information indicates disabling the access network unload function, the SGW sends the bearer update request carrying the user plane uplink address and the TEID corresponding to the user equipment locally.

In step 706, the SGSN sends a radio access network bearer assignment request to the access network, and if the access network unload continues to be executed, and what the radio access network bearer assignment request carries is the user plane uplink address and the TEID corresponding to the user equipment at the PGW; and if the access network unload function is not executed, what the radio access network bearer assignment request carries is the user plane uplink address and the TEID corresponding to the user equipment at the SGW.

In step 707, the RRC connection is reconfigured.

In step 708, the access network sends a radio access network bearer assignment reply to the SGSN, where the radio access network bearer assignment reply carries the user plane downlink address and the TEID corresponding to the user equipment at the access network.

In step 709, the SGSN sends the bearer updating reply to the SGW, where the bearer updating reply carries a user plane downlink address and a TEID corresponding to the user equipment at the access network.

In step 710, if the access network unload enabling information indicates continuing to execute the access network unload, the SGW replaces the user plane downlink address and the TEID allocated for the user equipment locally with the user plane downlink address and the TEID corresponding to the user equipment at the access network in the bearer updating request; if the access network unload is not executed anymore according to an unload indication of the access network unload, the SGW sends the bearer updating request carrying the user plane downlink address and the TEID corresponding to the user equipment locally.

In step 711, if the access network unload enabling information indicates continuing to execute the access network unload, the SGW replaces the user plane uplink address and the TEID allocated for the user equipment locally with the user plane uplink address and the TEID corresponding to the user equipment at the PGW in the bearer updating request, and sends the bearer updating request with the user plane uplink address and the TEID replaced to the access network; if the access network unload is not executed anymore according to the unload indication, the SGW sends the bearer updating request carrying the user plane uplink address and the TEID corresponding to the user equipment locally.

In the method for routing the user plane data in the mobile network according to this embodiment, the data is directly routed between a Home NodeB, a Home NodeB gateway or a macro network access network and a PDN gateway through a tunnel between the access network and the PDN gateway, which shortens the transmission delay of data and ensures the Quality of Service of transmission. In this embodiment, routing of all bearers in a single PDN connection of the user equipment may be modified in batches, that is, whether the access network unload is performed, and whether routing is performed through the SGW or without being through the SGW.

Embodiment 5

Figure 8:
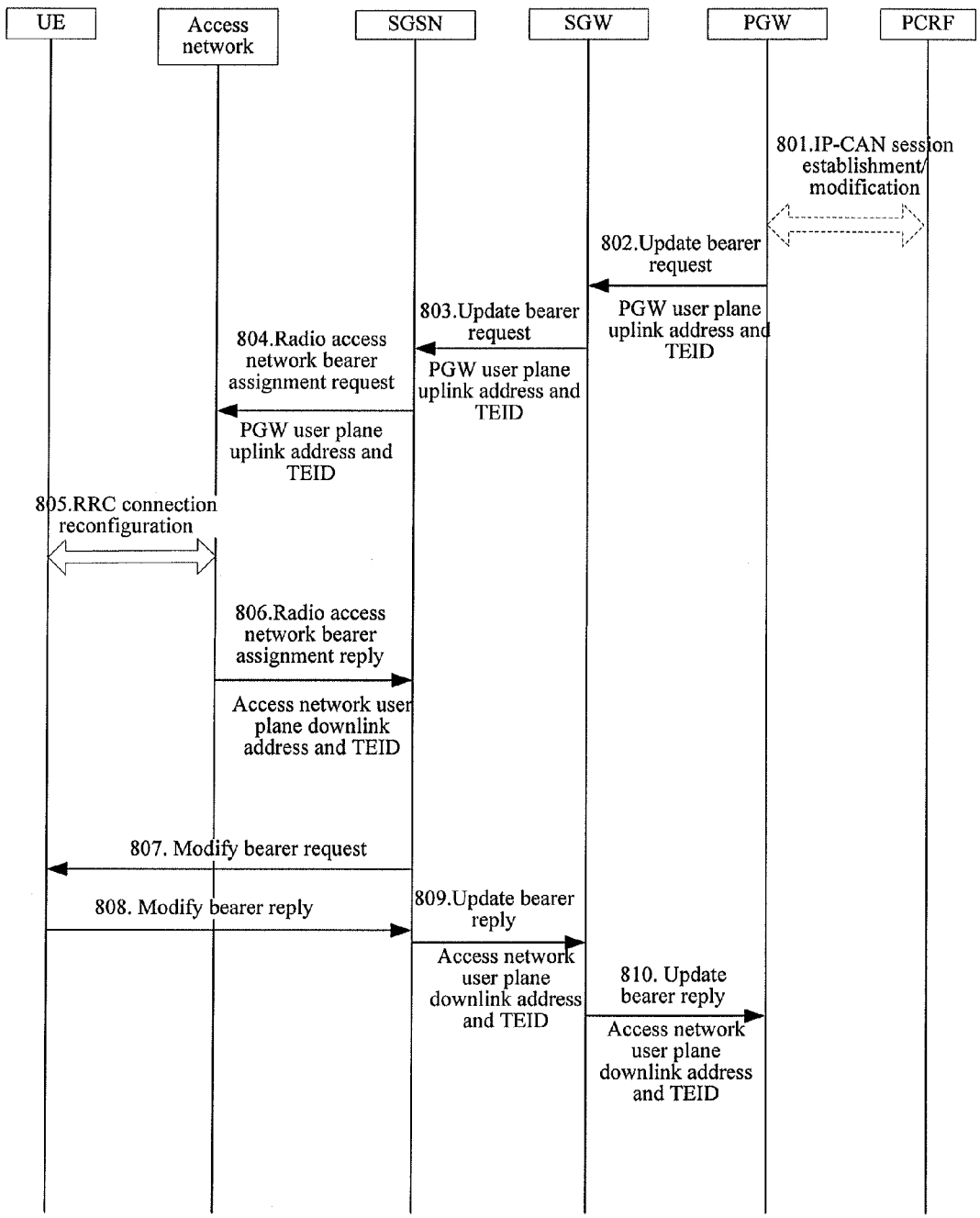
FIG. 8 is a flow chart of a method for routing user plane data in a mobile network according to Embodiment 5.

The difference between this embodiment and the foregoing embodiment lies in that, a PGW modifies the established tunnel, as shown in FIG. 8, where the specific process is as follows.

In step 801, optionally, the PGW may interact with a PCRF, so as to perform IP-CAN session establishment/modification.

In step 802, the PGW sends a bearer updating request to an SGW, where the bearer updating request carries a user plane uplink address and a TEID corresponding to the user equipment at the POW.

In step 803, the SGW determines a PDN connection of the bearer according to a bearer ID, and determines, according to access network unload enabling information in an SGW bearer context, whether an access network unload function is initiated. If the access network unload enabling information indicates performing access network flow unload, the SGW replaces a user plane uplink address and a TEID which should be allocated by itself with the user plane uplink address and the TEID corresponding to the user equipment at the PGW in the update dedicated bearer request sent to the SGSN.

In step 804, the SGSN sends a radio access network bearer assignment request to the access network, where the radio access network bearer assignment request carries the user plane uplink address and the TEID corresponding to the user equipment at the PGW.

In step 805, the RRC connection is reconfigured.

In step 806, the access network sends a radio access network bearer assignment reply to the SGSN, where the radio access network bearer assignment reply carries a user plane downlink address and a TEID corresponding to the user equipment at the access network.

In step 807, the access network sends a bearer modifying request to the user equipment.

In step 808, the user equipment sends a bearer modifying reply.

In step 809, the SGSN sends a bearer updating reply to the SGW, where the bearer updating reply carries the user plane downlink address and the TEID corresponding to the user equipment at the access network.

In step 810, the SGW sends the bearer updating reply to the PGW. If the access network unload is executed according to the access network unload enabling information, the SGW sends the bearer updating request to the PGW and replaces a user plane downlink address and a TEID configured locally with the user plane downlink address and the TEID corresponding to the user equipment at the access network in the bearer updating request.

In the method for routing the user plane data in the mobile network according to this embodiment, the data is directly routed between a Home NodeB, a Home NodeB gateway or a macro network access network and a PDN gateway through a tunnel between the access network and the PDN gateway, which shortens the transmission delay of data and ensures the Quality of Service of transmission.

Embodiment 6

Figure 9:
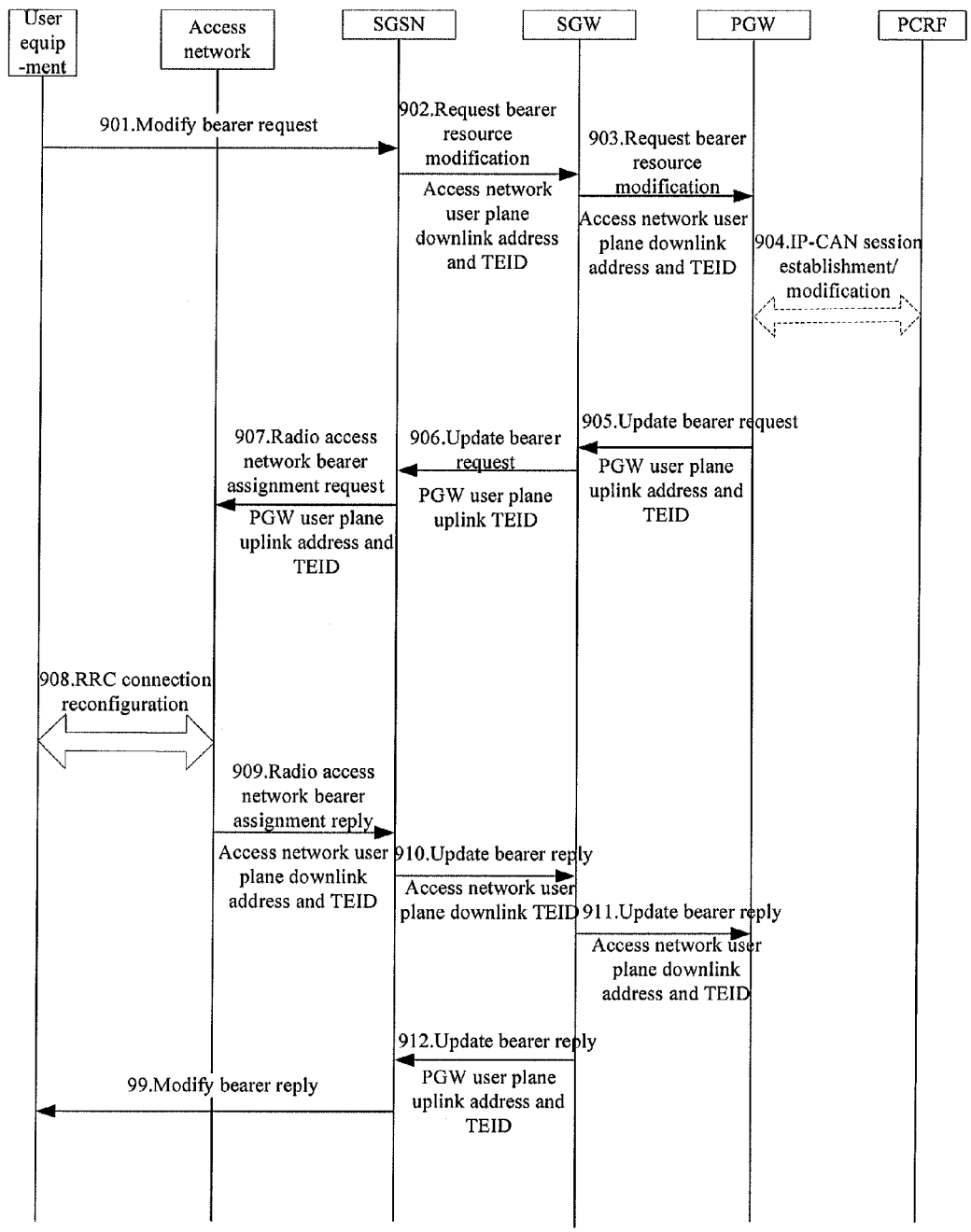
FIG. 9 is a flow chart of a method for routing user plane data in a mobile network according to Embodiment 6.

The difference between this embodiment and the foregoing embodiment lies in that, a user equipment modifies an established tunnel, as shown in FIG. 9, the specific process is as follows.

In step 901, the user equipment sends a bearer modifying request to an SGSN.

In step 902, the SGSN sends the bearer modifying request that carries a user plane downlink address and a TEID corresponding to the user equipment at the access network to an SGW.

Other procedures are the same as those in the foregoing embodiment, and are not repeated anymore herein.

In the method for routing the user plane data in the mobile network according to this embodiment, the data is directly routed between a Home NodeB, a Home NodeB gateway or a macro network access network and a PDN gateway through a tunnel between the access network and the PDN gateway, which shortens the transmission delay of data and ensures the Quality of Service of transmission.

Embodiment 7

Figure 10:
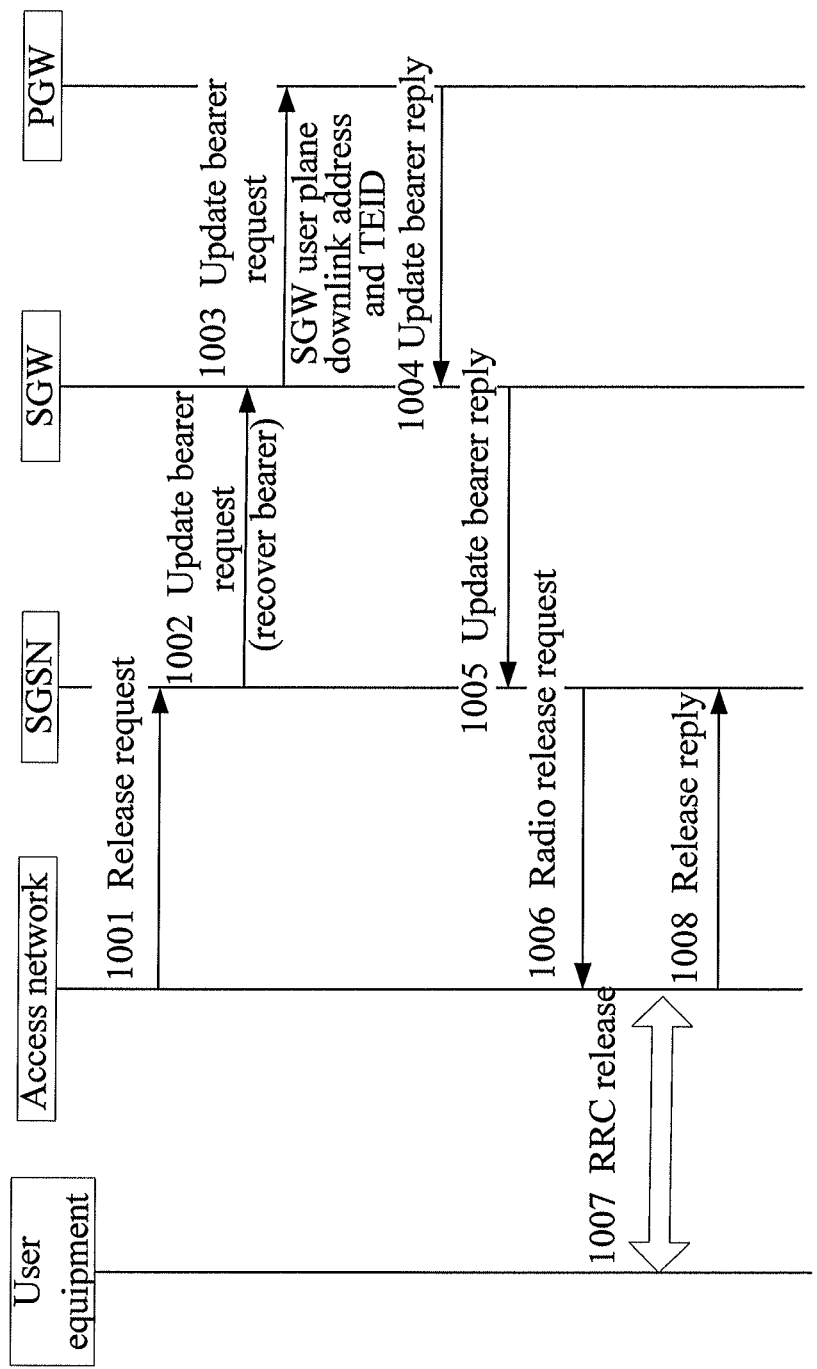
FIG. 10 is a flow chart of a method for routing user plane data in a mobile network according to Embodiment 7.

The difference between this embodiment and the foregoing embodiment lies in that, when a user equipment is switched into an idle state, a tunnel management procedure is illustrated, as shown in FIG. 10, where the specific process is as follows.

In step 1001, an access network sends a radio access bearer release request.

In step 1002, an SGSN sends an bearer updating request to an SGW, where the bearer updating request carries a recovery bearer indication of disabling access network unload. The recovery bearer indication may be an unload indication in the foregoing embodiment, and may also be an implicit indication capable of triggering the SGW to initiate bearer update to a PGW, such as position information and QoS negotiation.

In step 1003, the SGW sends a bearer updating request to the PDN gateway, and the bearer updating request carries a user plane downlink address and a TEID corresponding to the user equipment locally.

In step 1004, the PGW sends a bearer updating reply to the SGW.

In step 1005, the SGW sends the bearer updating reply to the SGSN.

In step 1006, the SGSN sends a radio access network bearer release request to the access network.

In step 1007, the access network releases the RRC connection.

In step 1008, the access network sends a radio access network bearer release reply to the SGSN.

In the method for routing the user plane data in the mobile network according to this embodiment, the data is directly routed between the Home NodeB, the Home NodeB gateway or the macro network access network and the PDN gateway through the tunnel between the access network and the PDN gateway, which shortens the transmission delay of data and ensures the Quality of Service of transmission. After the access network unload function is enabled, the user equipment is switched into an idle state, so that the core network bearer enters a normal user equipment idle state route, which ensures idle state downlink data routing and paging.

Embodiment 8

Figure 11:
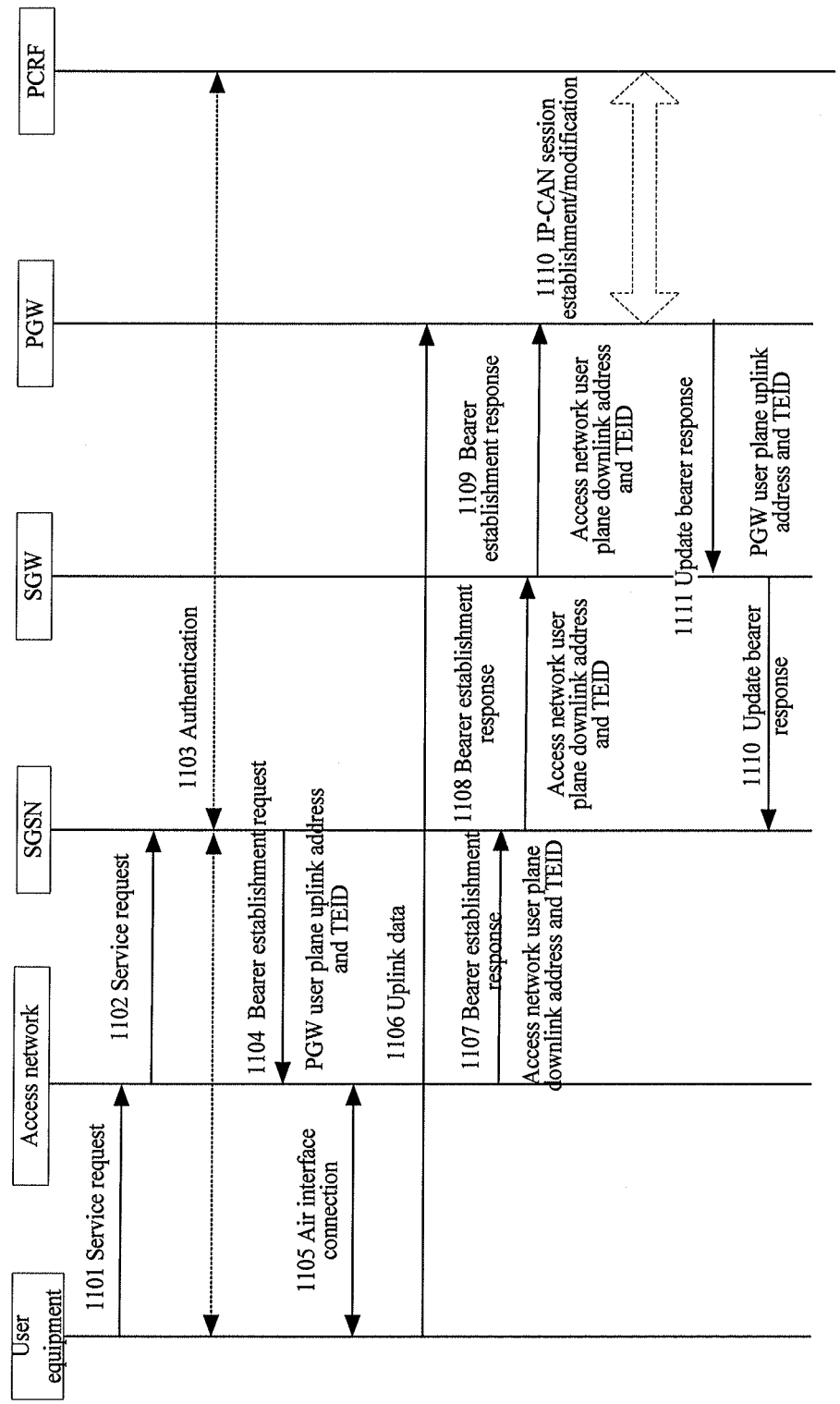
FIG. 11 is a flow chart of a method for routing user plane data in a mobile network according to Embodiment 8.

The difference between this embodiment and the foregoing embodiment lies in that, when a user equipment is switched into a connection state, a tunnel management procedure is illustrated, as shown in FIG. 11, where the specific process is as follows.

In step 1101, the user equipment sends a service request to an access network.

In step 1102, the access network sends the service request to an SGSN.

In step 1103, an authentication process is preformed.

In step 1104, the SGSN sends a radio access network bearer establishment request to the access network, where the radio access bearer establishment request carries a user plane uplink address and a TEID corresponding to the user equipment at a PGW.

In step 1105, an air interface bearer is established.

In step 1 106, uplink data begins to be transmitted. The access network may directly send the data to the PGW.

In step 1107, the access network sends a radio access network bearer establishment response to the SGSN, where the radio the access network bearer establishment response carries a user plane downlink address and a TEID corresponding to the user equipment at the access network.

In step 1108, the SGSN sends a bearer updating request to the SGW, where the bearer updating request carries a recovery bearer indication of the user plane downlink address and the TEID corresponding to the user equipment at the access network, and the recovery bearer indication is used for demonstrating that access network unload needs to be performed, and a downlink bearer is recovered and established at the access network. The recovery bearer indication may be the unload indication according to the foregoing embodiment, and may also be an implicit indication capable of triggering the SGW to initiate bearer update to the PGW, such as position information and QoS negotiation.

In step 1109, the SGW sends a bearer updating request to the PGW, where the bearer updating request carries a user plane downlink address and a TEID corresponding to the user equipment at the access network.

In step 1110, optionally, the PGW may interact with a PCRF, so as to perform IP-CAN session establishment/modification.

In step 1111, the PGW sends a bearer updating response to the SGW, where the bearer updating response carries the user plane uplink address and the TEID corresponding to the user equipment at the PGW.

In step 1112, the SGW sends the bearer updating response to the SGSN.

Optionally, step 1104 may further include:

If the SGSN does not save the user plane uplink address of the PGW, before this step, the SGSN should firstly perform bearer update once, which is similar to steps 1108 to 1112. The SGSN sends the bearer updating request carrying the recovery bearer indication to the SGW, which demonstrates that the access network unload needs to be performed, and the downlink bearer is recovered and established on the access network. The recovery bearer indication may be the unload indication described in the foregoing embodiment. The SGW sends a bearer updating request to the PGW, where the bearer updating request carries a user plane downlink address and a TEID corresponding to the user equipment locally. The PGW sends a bearer updating reply to the SGW, and the bearer updating reply carry the user plane uplink address and the TEID allocated by the PDN gateway. The SGW sends the bearer updating reply to the SGSN, the SGW replaces the user plane uplink address and the TEID allocated for the user equipment locally with the user plane uplink address and the TEID of the user equipment at the PGW according to the recovery bearer indication, and sends the bearer updating reply with the user plane uplink address and the TEID replaced to the SGSN.

In the method for routing the user plane data in the mobile network according to this embodiment, the data is directly routed between a Home NodeB, a Home NodeB gateway or a macro network access network and a PDN gateway through a tunnel between the access network and the PDN gateway, which shortens the transmission delay of data and ensures the Quality of Service of transmission. After the access network unload function is enabled, the user equipment is switched into an idle state, so that the core network bearer enters a normal user equipment idle state route, which ensures idle state downlink data routing and paging.

It should be noted that, in Embodiments 1 to 8, when the access network and the PGW are integrated together or use an internal interface device, the SGW in the embodiments may not replace the user plane address of the access network or the PGW, and replaces only the TEID, and the PDN gateway or the access network judges, in dependence on an indication sent by the network side or an internal logic, whether these bearers need to be interconnected in the device.

Embodiment 9

The difference between this embodiment and the foregoing embodiment lies in that, by carrying an identifier of a user equipment used for identifying a user equipment in a message, a establishment and update procedure is performed on a radio access network bearer, so that processing performed on the user plane address and the TEID by the SGW in the prior art is not changed, while the method is applicable to a conventional 3G core network.

Because a value of an identifier of a radio access network bearer (RAB ID, E-RAB ID) of each user equipment on the access network side is corresponding one by one to that of an identifier of an evolved packet system bearer (EPS bearer ID, evolved core network) on the core network side; or, the value of the radio access network bearer ID (RAB ID or E-RAB ID) at the access network side is corresponding one by one to that of an network layer service access point identifier (NSAPI, conventional 3G core network) on the core network side, the value corresponding to different user equipments may be repeated. In this embodiment, the PGW sends an identifier of the user equipment (such as an IMSI, an MSISDN, a P-TMSI, and an S-TMSI) consistent with a context of an internal user equipment of the PGW/L-GGSN to the access network (particularly an RNC, an eNodeB, an HNB, and HeNB) through an access network control plane message (such as an S1AP message of an EUTRAN access network S1 interface, particularly access network bearer management messages such as an INITIAL CONTEXT SETUP REQUEST, an E-RAB SETUP REQUEST, and an E-RAB MODIFY REQUEST; and an Iu interface RANAP message of a UTRAN access network, and an HNBAP message, particularly access network bearer management messages such as an RAB ASSIGNMENT REQUEST), so that the PGW and the access network determine a corresponding relation between an identifier of the radio access network bearer (RAB ID or E-RAB ID) of the user equipment and an identifier of an evolved packet system bearer (EPS bearer ID), or a corresponding relation between the identifier of a radio access network bearer (RAB ID or E-RAB ID) of the user equipment and a network layer service access point identifier (NSAPI). Definitely, one special indication for identifying the user equipment may also be simultaneously allocated to the access network and the PGW, and the identifier of the radio access network bearer (RAB ID or E-RAB ID) is combined with the identifier of the evolved packet system bearer (EPS bearer ID) or the network layer service access point identifier (NSAPI) in the access network and the GGSN/PGW, so as to complete one-to-one correspondence of bearers.

Figure 12:
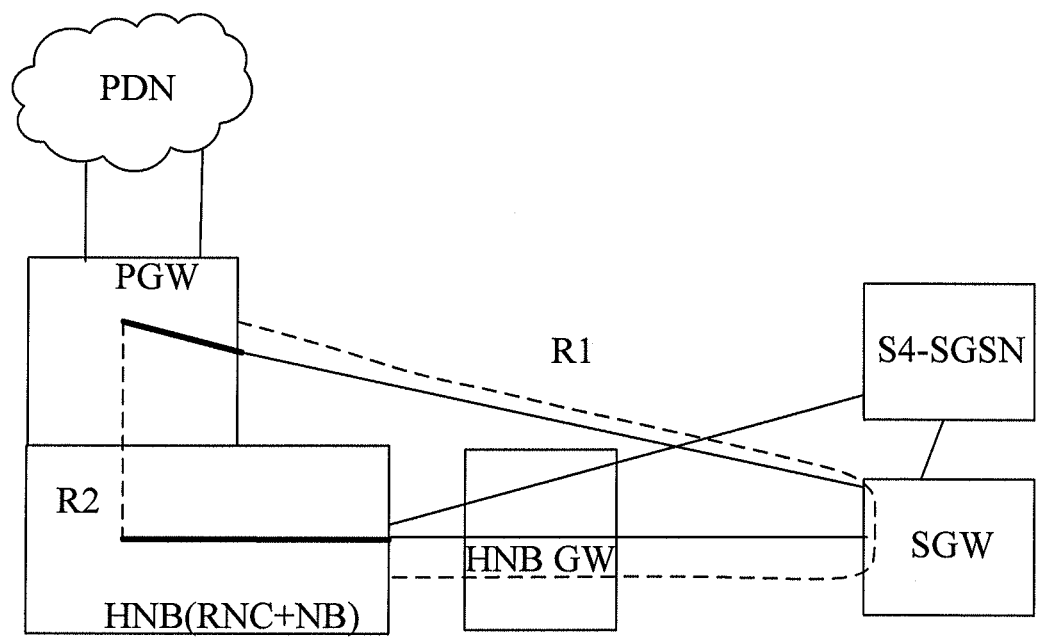
FIG. 12 is a schematic diagram of a network architecture of a system for routing user plane data in a mobile network according to Embodiment 9.

As shown in FIG. 12, when the access network and the PGW are integrated together (L-PGW) and when the user equipment is switched into or is in a connection state, an air interface and an access network bearer are established, a user plane transmission channel, that is, R2 transmission channel in the drawing, of the access network and the L-PGW of an integration device is handed over into an internal direction, and an external tunnel established in a normal procedure maintains unchanged, but does not transmit data. When the user equipment is switched into or is in an idle state, the air interface and the access network bearer are released, the core network bearer is not released, a user plane transmission channel, that is, R1 transmission channel in the drawing, of the access network and the L-PGW of an integration device is handed over into an external direction, and the external tunnel established in the normal procedure maintains unchanged, and recovers the data transmission function.

In the method for routing the user plane data in the mobile network according to this embodiment, the data is directly routed between a Home NodeB, a Home NodeB gateway or a macro network access network and a PDN gateway through a tunnel between the access network and the PDN gateway, which shortens the transmission delay of data and ensures the Quality of Service of transmission. It should be noted that, the method according to this embodiment is also applicable to a conventional 3G core network (formed of an SGSN and a GGSN), and in this case the access network integrates functions of the GGSN (L-GGSN).

Embodiment 10

Figure 13:
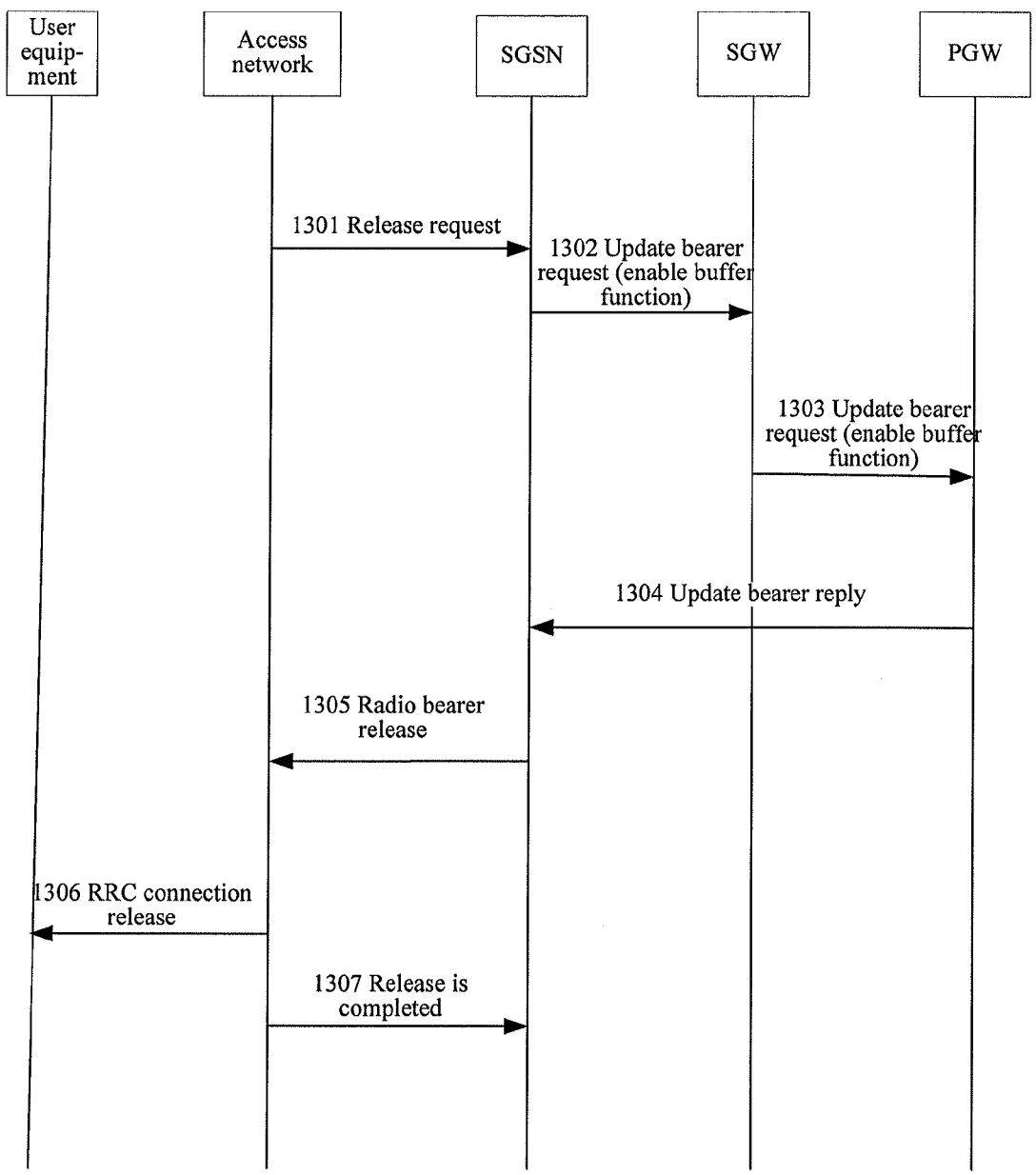
FIG. 13 is a flow chart of a method for routing user plane data in a mobile network according to Embodiment 10.

The difference between this embodiment and the foregoing embodiment lies in that, when a user equipment is in an idle state, an air interface and a radio access network bearer are released and a core network reserves a user bearer, and when user downlink data arrives, the PGW buffers the downlink data, the PGW notifies the SGW of triggering the paging process. An EPC core network and a UTRAN access network are illustrated here as an example, as shown in FIG. 13.

In step 1301, the access network sends a radio access network release request to an SGSN.

In step 1302, the SGSN sends a bearer updating request to the SGW, where the bearer updating request carries enabling information of a downlink data buffer function, so as to instruct the PGW to initiate the downlink data buffer function.

In step 1303, the SGW sends a bearer updating request to the PGW, where the bearer updating request carries a user plane downlink address and a TEID corresponding to the user equipment locally.

In step 1304, the PGW initiates a local buffer function according to the enabling information of the downlink data buffer function, and sends a bearer updating reply to the SGW, and at this time the downlink tunnel is recovered and established between the SGW and the PGW.

In step 1305, the SGW sends the bearer updating reply to the SGSN.

In step 1306, the SGSN sends a radio access network bearer release request to the access network.

In step 1307, the access network releases the RRC connection.

In step 1308, the access network sends a radio access network release reply to the SGSN.

When downlink data arrives, the downlink data is buffered in the PGW, and the PGW only replicates one or a few of data packets to be sent to the SGW as downlink data. What is sent by the PGW may also be a data packet including special information or a control plane signaling, so as to notify the SGW of the arrival of the downlink data of the user equipment.

Optionally, a timer may be set on the PGW, and the timer may be configured that a downlink data packet may be not sent to the SGW anymore before the timer expires; after the timer expires, if a further downlink data packet arrives, one or a few of data packets continue to be replicated and sent to the SGW as downlink data, so as to trigger the paging.

When the user equipment initiates a service request spontaneously or due to the paging triggered by the downlink data, the bearer modification request sent by the SGSN to the SGW does not carry a buffer data indication, or carries a buffer data indication indicating that the buffer is not performed, and the PGW immediately delivers buffer data, referring to the second step and the tenth step in Embodiment 4.

In the method for routing user plane data in a mobile network according to this embodiment, when the user equipment is switched into the idle state, the tunnel between the SGSN and the PDN gateway is recovered, and the downlink data is buffered in the PDN gateway, so that the normal paging function is ensured while the backhaul pressure of an operator network is alleviated. The PDN gateway sends the indication information about triggering the paging, so that the serving gateway sends a paging message to the user equipment according to the indication information, so as to trigger an establishment request of a radio bearer between the serving gateway and the data network, and realize direct routing on a user plane between the PDN gateway and the access network where the user equipment is located, and the buffer data is directly sent to the access network from the PDN gateway, so that the pressure on a bearer network caused by transmission of the downlink data through the serving gateway is alleviated and the delay is reduced.

Embodiment 11

Figure 14:
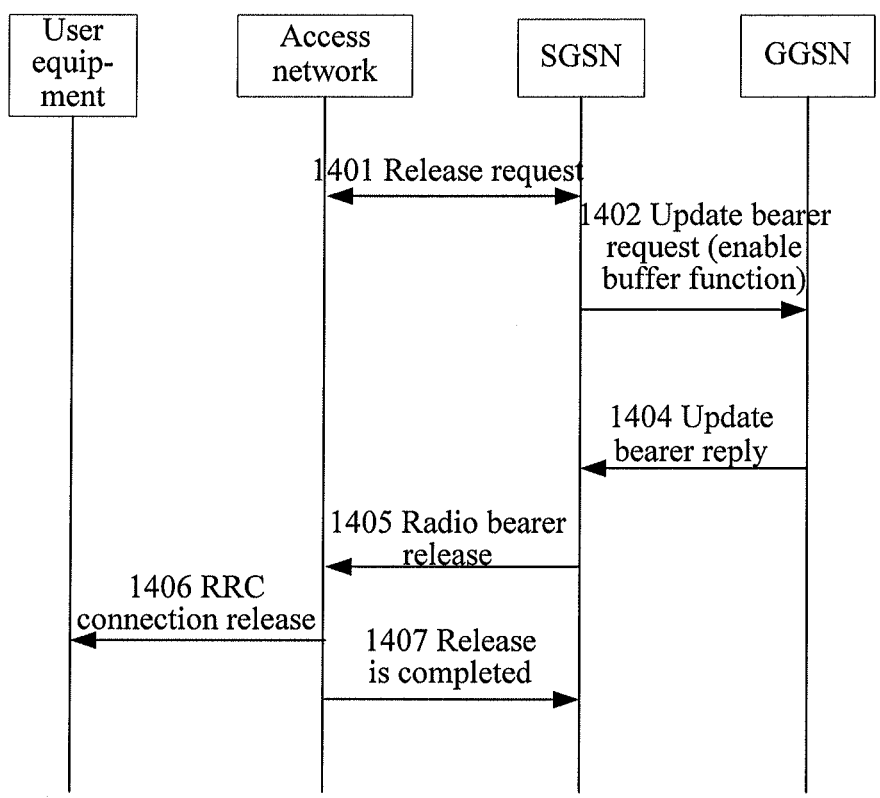
FIG. 14 is a flow chart of a method for routing user plane data in a mobile network according to Embodiment 11.

The difference between this embodiment and Embodiment 10 lies in that, a UTRAN access network accessing to a conventional 3G core network is illustrated here as an example, as shown in FIG. 14, where the specific process is as follows.

In step 1401, an Iu release request is sent.

In step 1402, the SGSN sends a bearer updating request to the GGSN, and the bearer updating request carries a user plane downlink address and a TEID corresponding to the user equipment at the SGSN, and carries enabling information of a downlink data buffer function, so as to instruct the GGSN to initiate the downlink data buffer function.

In step 1403, the GGSN sends a bearer updating reply to the SGSN. The downlink tunnel is recovered and established between the SGSN and the GGSN.

In step 1404, the SGSN sends an Iu release command to the access network.

In step 1405, a connection is released.

In step 1406, the Iu release is completed.

For each user equipment, when downlink data arrives, only one or a few of data packets are replicated and sent to the SGSN as downlink data, so as to trigger the paging. A timer may be set on the GGSN, and a downlink data packet is not sent to the SGSN anymore before the timer expires; after the timer expires, if a downlink data packet arrives, one or a few of data packets continue to be replicated and sent to the SGSN as downlink data, so as to trigger the paging. What is sent by the GGSN may also be a datagram including special information or a control plane signaling, so as to notify the SGSN of the arrival of the downlink data of the user equipment.

When the user equipment initiates a service request spontaneously or due to the paging triggered by the downlink data, the bearer modification request sent by the SGSN to the GGSN does not carry a buffer data indication, or carries buffer data indication indicating that the buffer is not performed, and the GGSN immediately delivers buffer data, referring to the second step and the tenth step in Embodiment 4.

In the method for routing user plane data in a mobile network according to this embodiment, when the user equipment is switched into the idle state, the tunnel between the SGSN and the PDN gateway is recovered, and the downlink data is buffered in the PDN gateway, so that the normal paging function is ensured while the backhaul pressure of an operator network is alleviated. The PDN gateway sends the indication information about triggering the paging, so that the serving gateway sends a paging message to the user equipment according to the indication information, so as to trigger an establishment request of a radio bearer between the serving gateway and the data network, and realize direct routing on a user plane between the PDN gateway and the access network where the user equipment is located, and the buffer data is directly sent to the access network from the PDN gateway, so that the pressure on a bearer network caused by transmission of the downlink data through the serving gateway is alleviated and the delay is reduced.

Embodiment 12

Figure 15:
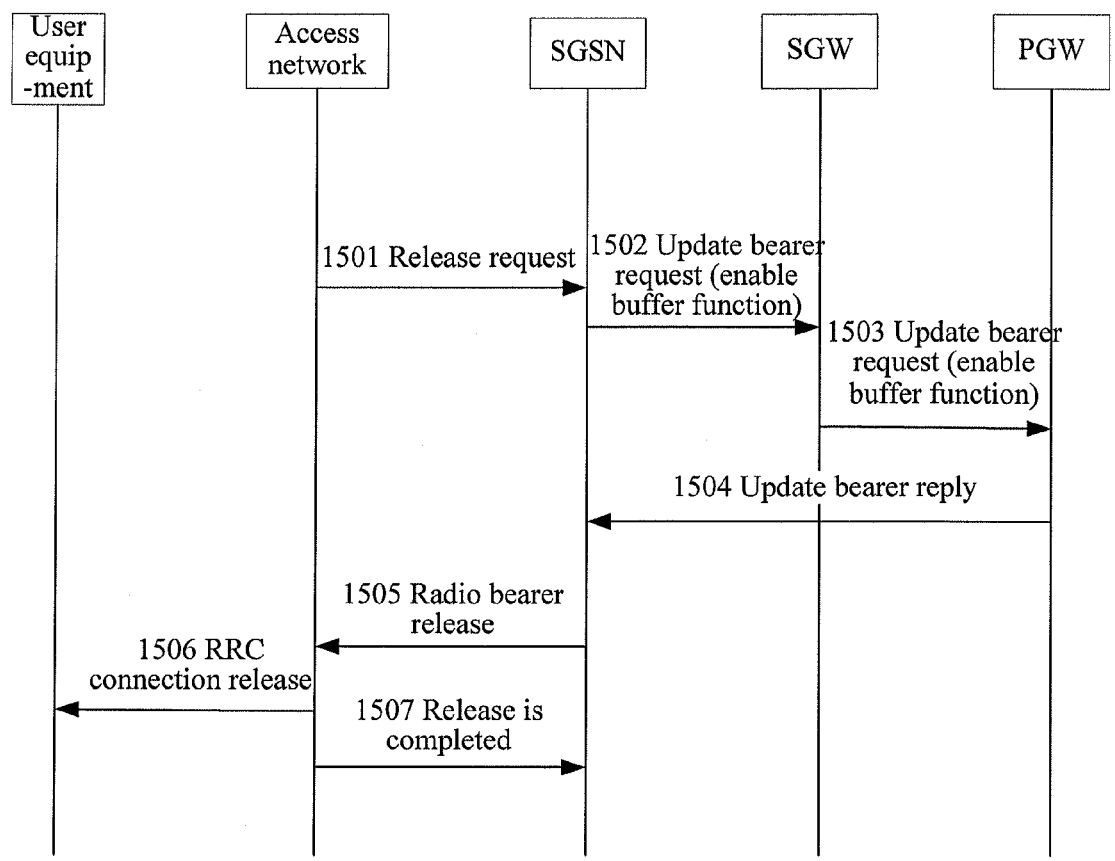
FIG. 15 is a flow chart of a method for routing user plane data in a mobile network according to Embodiment 12.

The difference between this embodiment and the foregoing embodiment lies in that, the PGW indicates the SGW to trigger the paging by sending a downlink data notification to the SGW, as shown in FIG. 15, and the difference lies in that, when downlink data arrives, the PGW sends the downlink data notification to the SGW, so as to indicate the arrival of the downlink data.

Optionally, a timer may be set on the PDN gateway, and a downlink data packet may be not sent to the SGW anymore before the timer is configured to expire; after the timer expires, if a downlink data packet arrives, the downlink data notification continues to be sent to the SGW, so as to indicate the arrival of the downlink data.

In the method for routing user plane data in a mobile network according to this embodiment, when the user equipment is switched into the idle state, the tunnel between the SGSN and the PDN gateway is recovered, and the downlink data is buffered in the PDN gateway, so that the normal paging function is ensured and the backhaul pressure of an operator network is alleviated. The PDN gateway sends the indication information of triggering the paging, so that the serving gateway sends a paging message to the user equipment according to the indication information, so as to trigger an establishment request of a radio bearer between the serving gateway and the data network, and realize direct routing on a user plane between the PDN gateway and the access network where the user equipment is located, and the buffer data is directly sent to the access network from the PDN gateway, so that the pressure on a bearer network caused by transmission of the downlink data through is alleviated the serving gateway and the delay is reduced.

It should be noted that, in Embodiments 10 to 12, when the PGW and the access network are integrated together, because the PGW may perceive the release of the radio access network bearer corresponding to the user equipment, and the PGW by itself buffers the downlink data of the user equipment. After a user plane interface is released, the bearer update request sent by the SGSN to the SGW may not carry the buffer data indication. When the user equipment initiates a service request, the radio access network bearer corresponding to the user equipment is established, and when a bearer modification request or a bearer updating request is sent to the GGSN or the PGW, the GGSN or the PGW by itself unblocks the downlink data to be buffered, and delivers the buffered data. In a bearer update procedure triggered by other reasons, for example, when the user equipment is handed over, is switched out of the idle state, enters other access networks (non-unload access network), updates a routing area and a tracking area, or initiates a service request, the PGW needs to be instructed to unblock the downlink data buffer function.

In Embodiments 1 to 12, the access network in the UTRAN may be an RNC+NodeB, an HNB (RNC+home NodeB), or an HNB GW, and the PGW and the GGSN may be an entity of a macro network core network (generally an entity close to the access network), and may also be an entity that is integrated with the RNC, the NodeB, the HNB or the HNB GW. Meanwhile, the method according to the embodiment of the present invention is likewise applicable to an EUTRAN system, and accordingly the access network is an eNodeB\HeNB or an HeNB GW. In the EUTRAN system, the SGSN in the embodiment is an MME, and the specific implementation method is similar, and therefore is not repeated anymore herein.

Embodiment 13

The difference between this embodiment and the foregoing embodiment lies in that, when the PGW or the GGSN is integrated with the access network together, in order to ensure that the PGW/GGSN can normally communicate with the SGW/SGSN to realize a tunnel management purpose, this embodiment provides the following method.

In this embodiment, the following application scenario is illustrated as an example.

Evolved core network with an evolved Home NodeB: An HeNB sends a control plane address of the PGW to an HeNB GW in a control plane message of an S1 interface UE level (such as INITIAL UE MESSAGE) or of a NodeB level (S1 SETUP REQUEST). The HeNB GW sends its own core network side signaling forwarding address in the control plane message of the S1 interface user equipment level, where the control plane message is sent to the MME, and correspondingly records the address in a NodeB context or a user equipment context of the HeNB GW. The MME sends the obtained control plane address of the PGW (practically the core network side signaling forwarding address of the HeNB GW after replacement) to the SGW in control plane messages such as a reconstruction bearer request or a bearer updating request, and the SGW uses the address to send such control plane messages as the reconstruction bearer request or the bearer updating request to the HeNB GW. The HeNB GW replaces the destination address of the message with the control plane address of the PGW (the source address of the message may be further replaced with its own NodeB side signaling forwarding address, and in this case, the SGW control plane address practically saved by the PGW on the HeNB is the NodeB side signaling forwarding address of the HeNB GW), and sends the control plane address to the HeNB. When the PGW sends the control plane message to the SGW, the HeNB GW replaces the source address of the message with its own core network side signaling forwarding address. The signaling forwarding address may be released when the HeNB is de-registered, the user equipment deactivates the PDN connection of the PGW, or a timer of the forward address on the HeNB GW without the signaling transmission for the context expires. The HeNB may not send the control plane address of the PGW to the HeNB GW in the S1 interface message, and the HeNB GW directly uses the control plane address of the HeNB as the control plane address of the PGW.

Evolved core network with a 3G Home NodeB: An HNB sends a control plane address of the PGW to an HNB GW in a control plane message of an Iu interface user equipment level (such as INITIAL UE MESSAGE) or of a NodeB level (HNB REGISTRATION REQUEST). The HNB GW sends its own core network side signaling forwarding address in the control plane message of the Iu interface user equipment level, where the control plane message sent to the SGSN, and correspondingly records the address in a NodeB context or a user equipment context of the HNB GW. The SGSN sends the obtained control plane address of the PGW (practically the core network side signaling forwarding address of the HNB GW after replacement) to the SGW in control plane messages such as a reconstruction bearer request or a bearer updating request, and the SGW uses the address to send control plane messages such as the reconstruction bearer request or the bearer updating request to the HNB GW. The HNB GW replaces the destination address of the message with the control plane address of the PGW (the source address of the message may be further replaced with its own NodeB side signaling forwarding address, and in this case, the SGW control plane address practically saved by the PGW on the HNB is the NodeB side signaling forwarding address of the HNB GW), and sends the control plane address to the HNB. When the PGW sends the control plane message to the SGW, the HNB GW replaces the source address of the message with its own signaling forwarding address. The signaling forwarding address may be released when the HNB is de-registered, the user equipment deactivates the PDN connection of the PGW, or a timer on the HNB GW without the signaling transmission in the context of the forwarding address expires. The HNB may not send the control plane address of the PGW to the HNB GW in the Iu interface message, and the HNB GW directly uses the control plane address of the HNB as the control plane address of the POW.

Conventional 3G core network with a 3G HNB: An HNB sends a control plane address of the L-GGSN to an HNB GW in a control plane message of an Iu interface user equipment level (such as INITIAL UE MESSAGE) or of a NodeB level (HNB REGISTRATION REQUEST). The HNB GW sends its own core network side signaling forwarding address in the control plane message of the Iu interface user equipment level, where the control plane message is sent to the SGSN, and correspondingly records the address in a context of the NodeB or of the user equipment of the HNB GW. The SGSN uses the address to send control plane messages such as the reconstruction bearer request or the bearer updating request to the HNB GW. The HNB GW replaces the destination address of the message with the control plane address of the L-GGSN (the source address of the message may be further replaced with its own NodeB side signaling forwarding address, and in this case, the SGSN control plane address practically saved by the L-GGSN on the HNB is the NodeB side signaling forwarding address of the HNB GW), and sends the control plane address to the HNB. When the L-GGSN sends the control plane message to the SGSN, the HNB GW replaces the source address of the message with its own core network side signaling forwarding address, and sends the core network side signaling forwarding address to the SGSN. The signaling forward address may be released when the HNB is de-registered, the user equipment deactivates the PDN connection of the L-GGSN, or a timer on the HNB GW without the signaling transmission in the context of the forwarding address expires. The HNB may not send the control plane address of the L-GGSN to the HNB GW in the Iu interface message, and the HNB GW directly uses the control plane address of the HNB as the control plane address of the L-GGSN.

In this embodiment, the gateway is a local PGW (PGW) integrating an HNB GW and an HeNB GW.

In the method for routing the user plane data in the mobile network according to this embodiment, the data is directly routed between a Home NodeB, a Home NodeB gateway or a macro network access network and a PDN gateway through a tunnel between the access network and the PDN gateway, which shortens the transmission delay of data and ensures the QoS of transmission. The Home NodeB gateway converts the control plane address of the message, so as to realize direct communication among different address domains, and thereby realize the management of the tunnel between the PGW and the access network.

It should be noted that, according to Embodiment 13, in the process for routing user plane data in a mobile network, when the PGW and the access network are integrated together, the problem of address confliction between the PGW and the SGW is solved, but the present invention is not limited to this, and the present invention is likewise applicable when data is transmitted through a control plane.

Embodiment 14

In this embodiment, in order to satisfy personalized needs of different user groups, a Home NodeB emerges in a 3GPP (3rd Generation Partnership Project) communication system. The Home NodeB is a type of NodeB, deployed at such sites as a home, a community, a company or a school as an exclusive resource for use, and serves some particular users. The Home NodeB may be set to be allowed to be resided or accessed by only certain user equipments having the private network right, and meanwhile, these user equipments may also be resided or accessed in a public network. A home access (Home Access) mode is a new access mode being researched by 3rd Generation Partnership Project and non-3rd Generation Partnership Project (non-3GPP) standard organizations currently.

Figure 16:
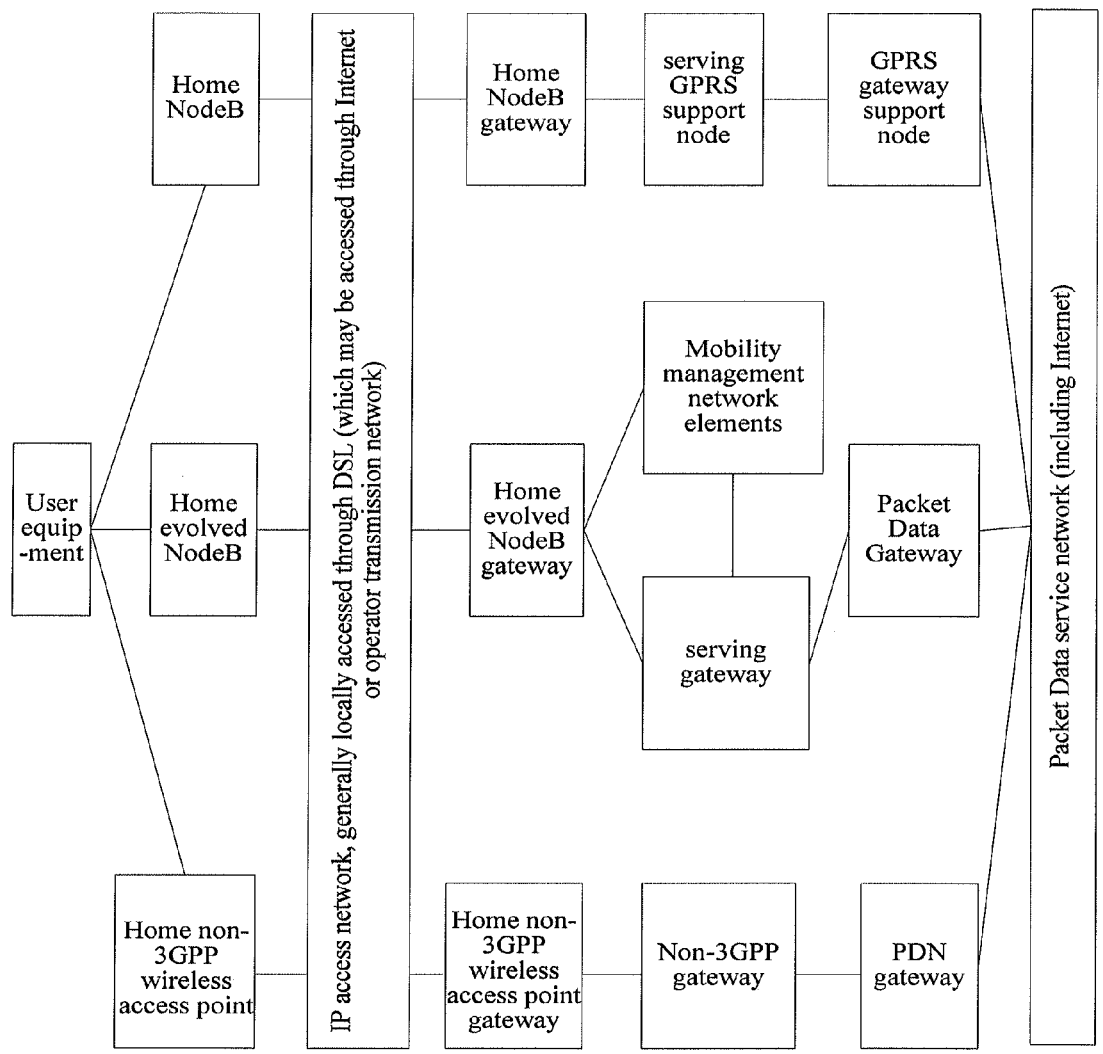
FIG. 16 is a schematic architectural diagram of a home network according to an embodiment of the present invention.

FIG. 16 exemplarily provides one of home access system architectures, where, a UMTS Home NodeB (Home NodeB, HNB, integrated RNC) is an Home NodeB using the UTRAN access technology; an HeNB (Home evolved NodeB, HeNB) is an Home NodeB using the LTE/LTE+ access technology; a Home non-3GPP Wireless Access Point (Home non-3GPP Wireless Access Point, Home non-3GPP WAP) is an Home NodeB using the non-3GPP access technology. In this patent, air interface wireless technology types are not distinguished for an Home NodeB, which is uniformly referred to as an Home NodeB.

Before getting access to an IP network, a Home NodeB placed in a home network generally needs to pass through a home gateway (Home GW), and the node converges the Home NodeB, routes and forwards signaling data between the Home NodeB and network elements in a mobile network, bearer management on a backhaul (such as DSL) network, and such functions as Quality of Service and network address conversion. Logically, the device and the home gateway of the Home NodeB are different network entities, but physically, the device and the home gateway of the Home NodeB generally may be realized on one entity.

The Home NodeB gateway (HNB GW), the Home evolved NodeB (HeNB GW), and the Home non-3GPP wireless access point gateway (Home non-3GPP WAP GW) respectively are gateway network elements of the Home NodeB, where the gateway network elements are connected with the HNB, the HeNB, and the Home non-3GPP WAP through a universal IP access network. In this patent, air interface wireless technology types are not distinguished, which is uniformly referred to as a Home NodeB gateway.

The network elements in the mobile network include: a mobility management entity (Mobility Management Entity, MME) in an E-UTRAN and a serving GPRS supporting node (Serving GPRS Supporting Node, SGSN) in a GPRS/UMTS, and a non-3GPP gateway (non-3GPP GW) including various implementing entities in a non-3GPP network, such as, an evolved packet data gateway (Evolved Packet Data Gateway, EPDG) in the WLAN, access service network gateway (Access Service Network Gateway, ASN GW) in the Wimax, an access gateway (Access Gateway, AGW) in the CDMA, and an HRPD serving gateway (HRPD Serving Gateway, HSGW) in the HRPD.

In the method for routing the user plane data in the mobile network according to this embodiment, the data is directly routed between a Home NodeB, a Home NodeB gateway or a macro network access network and a PDN gateway through a tunnel between the access network and the PDN gateway, which shortens the transmission delay of data and ensures the Quality of Service of transmission. The Home NodeB gateway converts the control plane address of the message, so as to realize direct communication among different address domains, and thereby realize management of the tunnel between the PDN gateway and the access network. The PDN gateway sends the indication information of triggering the paging, so that the serving gateway sends a paging message to the user equipment according to the indication information, so as to trigger an establishment request of a radio bearer between the serving gateway and the data network, realize direct routing of a user plane between the PDN gateway and the access network where the user equipment is located, and thereby alleviate the pressure of transmitting the downlink data of the serving gateway.

Figure 17:
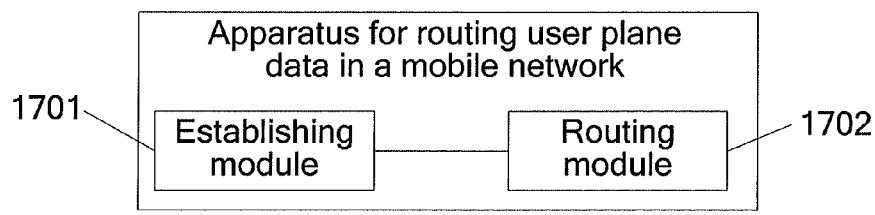
FIG. 17 is a schematic structural diagram of an apparatus for routing user plane data in a mobile network according to an embodiment of the present invention.

As shown in FIG. 17, an embodiment of the present invention provides an apparatus for routing user plane data in a mobile network, which includes:

an establishing module 1701, configured to directly interconnect an access network bearer of a user equipment and a PDN gateway bearer of the user equipment through a tunnel established between an access network and a PDN gateway; and a routing module 1702, configured to directly route data between a Home NodeB, an Home NodeB gateway or a macro network access network and a PDN gateway through the tunnel established by the establishing module.

Figure 18:
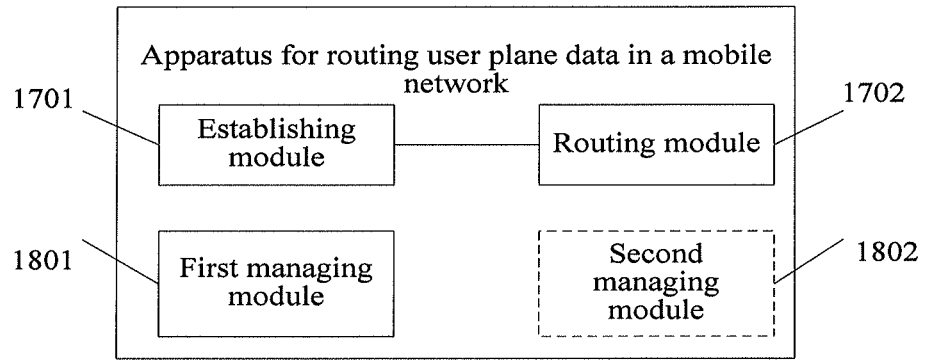
FIG. 18 is another schematic structural diagram of the apparatus for routing user plane data in a mobile network according to the embodiment as shown in FIG. 17.

Further, as shown in FIG. 18, the apparatus may further include a first managing module 1801 and/or a second managing module 1802.

The first managing module 1801 is configured to: when the apparatus is deployed at the access network and when a mobile network core network is an evolved core network, receive a management message sent by an MME or an SGSN where the management message is sent to the MME or the SGSN by an SGW and the management message carries a tunnel endpoint identifier of the PDN gateway, and manage an uplink tunnel corresponding to the tunnel endpoint identifier of the PDN gateway according to the tunnel endpoint identifier of the PDN gateway; or, when the tunnel is identified with the identifier of the user equipment, receive a message carrying the identifier of the user equipment, determine a unique identifier of the access network bearer corresponding to the identifier of the user equipment according to the identifier of the user equipment, and manage an uplink tunnel corresponding to the unique identifier of the access network bearer.

The second managing module 1802 is configured to: when the apparatus is integrated in the PDN gateway and when the mobile network core network is an evolved core network, receive a management message sent by the SGW, where the management message is sent to the SGW by the MME or the SGSN and the management message carries a tunnel endpoint identifier of the access network, and manage the downlink tunnel corresponding to the tunnel endpoint identifier of the access network according to the tunnel endpoint identifier of the access network; or, when the tunnel is identified with the identifier of the user equipment, receive a message carrying the identifier of the user equipment, determine a unique identifier of the core network bearer corresponding to the identifier of the user equipment according to the identifier of the user equipment, and manage a downlink tunnel corresponding to the unique identifier of the core network bearer.

Figure 19:
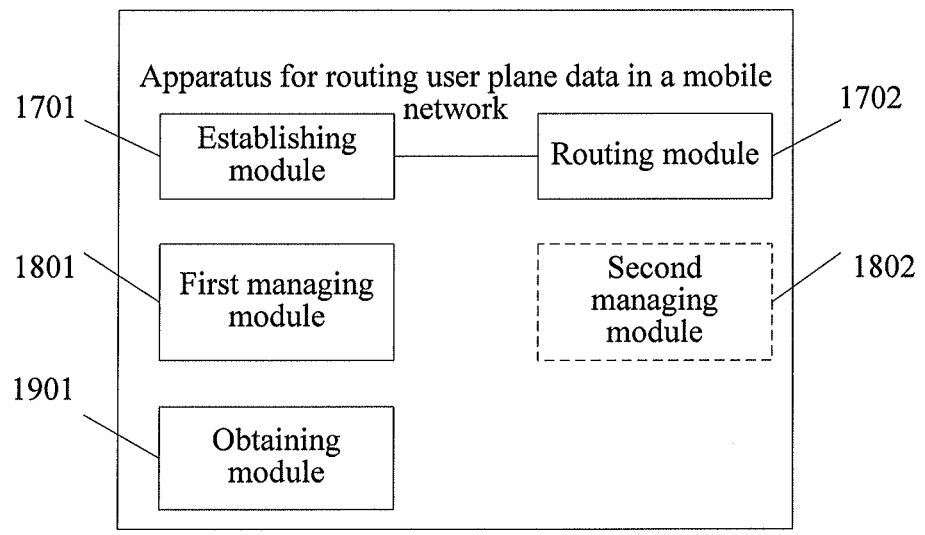
FIG. 19 is still another schematic structural diagram of the apparatus for routing user plane data in a mobile network according to the embodiment as shown in FIG. 17.

Optionally, as shown in FIG. 19, the apparatus may further include:

an obtaining module 1901, configured to obtain the identifier of the user equipment by receiving an access network control plane message carrying the identifier of the user equipment when the first managing module or the second managing module identifies the tunnel with the identifier of the user equipment, where the access network control plane message is an INITIAL CONTEXT SETUP REQUEST, an E-RAB SETUP REQUEST, an E-RAB MODIFY REQUEST or an RAB ASSIGNMENT REQUEST.

Figure 20:
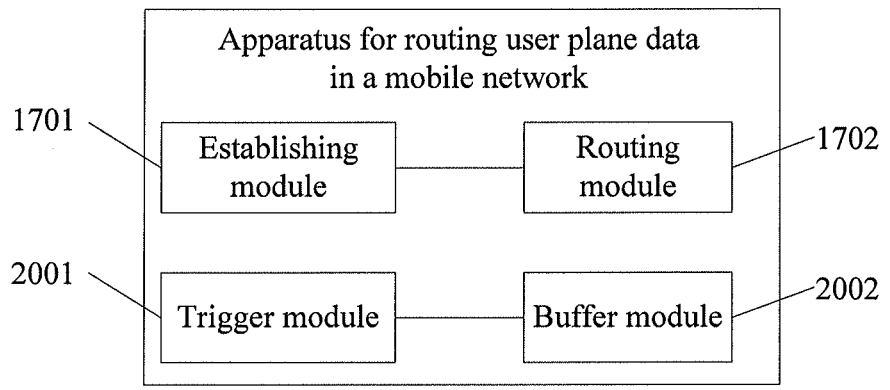
FIG. 20 is still another schematic structural diagram of the apparatus for routing user plane data in a mobile network according to the embodiment as shown in FIG. 17.

Optionally, as shown in FIG. 20, when the apparatus is the PDN gateway, the apparatus may further include:

a trigger module 2001, configured to send trigger paging indication information before the establishing module establishes the tunnel, where the trigger paging indication information indicates that downlink data exists, so that the SGW or the SGSN sends a paging message to the UE according to the trigger paging indication information, so as to indicate the UE to initiate a management procedure of the uplink tunnel.

Further, as shown in FIG. 20, the PDN gateway may further include;

a buffer module 2002, configured to: receive data buffer enabling information sent by the network side, before the trigger module sends the trigger paging indication information, and buffer the downlink data when the data buffer enabling information indicates to buffer the data; or, obtain a connection state of the tunnel when the access network and the PDN gateway are integrated together, and buffer the downlink data when the tunnel is in a disconnection state.

The apparatus for routing the user plane data in the mobile network according to the embodiment of the present invention directly routes the data between a Home NodeB, a Home NodeB gateway or a macro network access network and a PDN gateway through a tunnel between the access network and the PDN gateway, thereby shortening the transmission delay of data and ensuring the Quality of Service of transmission. The PDN gateway sends the indication information of triggering the paging, so that the serving gateway sends a paging message to the user equipment according to the indication information, to trigger an establishment request of a radio bearer between the serving gateway the data network, and realize direct routing of a user plane between the PDN gateway and the access network where the user equipment is located, and the buffer data is directly sent to the access network from the PDN gateway. thereby, the pressure on a bearer network caused by transmission of the downlink data through the serving gateway is alleviated and the delay is reduced. The Home NodeB gateway converts the control plane address of the message, so as to realize direct communication among different address domains, and thereby realize management of the tunnel between the PGW and the access network. The PDN gateway sends the indication information of triggering the paging, so that the serving gateway sends a paging message to the user equipment according to the indication information, so as to trigger an establishment request of a radio bearer between the serving gateway the data network, realize direct routing of a user plane between the PDN gateway and the access network where the user equipment is located, and thereby alleviate the pressure of transmitting the downlink data of the serving gateway.

Figure 21:
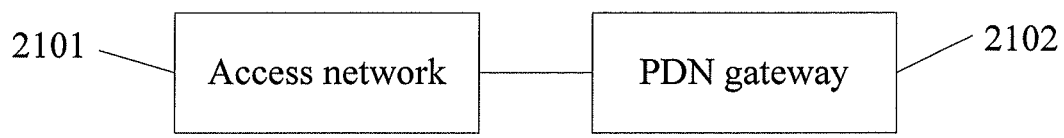
FIG. 21 is a schematic structural diagram of a communication system according to an embodiment of the present invention.

Additionally, as shown in FIG. 21, a communication system according to an embodiment of the present invention includes an access network 2101 and a PDN gateway 2102, where an access network bearer of a user equipment and a PDN gateway bearer of the user equipment are directly interconnected through a tunnel established between the access network and the PDN gateway; data between the access network and the PDN gateway is directly routed through the tunnel.

Optionally, the communication system may further include a serving gateway, configured to: when the tunnel is identified with a tunnel endpoint identifier, determine, according to access network unload enabling information, whether an access network unload function is enabled; in an uplink tunnel management process, if the function is enabled, the SGW sends a management message carrying a tunnel endpoint identifier of the PDN gateway to the access network; if the function is not enabled, sends a management message carrying a tunnel endpoint identifier of the PDN gateway to the access network; and/or in a downlink tunnel management process, if the function is enabled, the SGW sends a management message carrying a tunnel endpoint identifier of the access network to the PDN gateway; if the function is not enabled, sends a management message carrying a tunnel endpoint identifier of the SGW to the PDN gateway.

In the communication system according to this embodiment, the data is directly routed between the Home NodeB, the Home NodeB gateway or the macro network access network and the PDN gateway through the tunnel between the access network and the PDN gateway, which shortens the transmission delay of data and ensures the Quality of Service of transmission. After the access network unload function is enabled, the user equipment is switched into an idle state, so that the core network bearer enters a normal user equipment idle state route, which ensures idle state downlink data routing and paging. When the user equipment is switched into the idle state, the tunnel between the SGSN and the PDN gateway is recovered, and the downlink data is buffered in the PDN gateway, so that the normal paging function is ensured and the backhaul pressure of an operator network is alleviated. The PDN gateway sends the indication information of triggering the paging, so that the serving gateway sends a paging message to the user equipment according to the indication information, to trigger an establishment request of wireless bearer between the serving gateway and the data network, and realize direct routing of a user plane between the PDN gateway and the access network where the user equipment is located, and the buffer data is directly sent to the access network from the PDN gateway, which alleviates the pressure on a bearer network caused by transmission of the downlink data through the serving gateway and reduces the delay.

Figure 22:
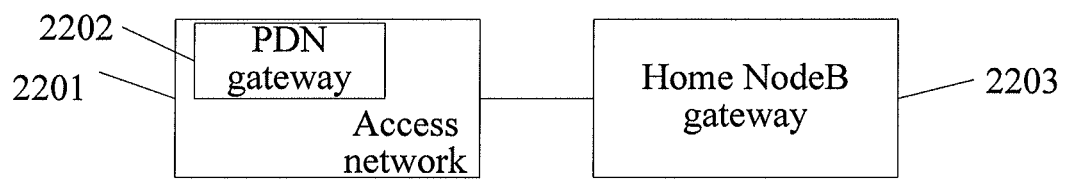
FIG. 22 is a schematic structural diagram of another communication system according to an embodiment of the present invention.

As shown in FIG. 22, an embodiment of the present invention provides another communication system, and the system includes a PDN gateway 2202 integrated in the access network 2201 and a Home NodeB gateway 2203.

The Home NodeB gateway 2203 is configured to: when a mobile network core network is an evolved core network, obtain a management message that carries a core network control plane address and is sent by an SGW, convert the core network control plane address in the management message into an access network control plane address, and send the management message with the control plane address replaced to the PDN gateway; and/or, obtain a management message that carries the access network control plane address and is sent by the PDN gateway, convert the access network control plane address in the management message into the core network control plane address, and send the management message with the control plane address replaced to the SGW.

When the mobile network core network is a conventional 3G core network, the Home NodeB gateway obtains a management message that carries a core network control plane address and is sent by the SGSN, converts the core network control plane address in the management message into an access network control plane address, and sends the management message with the control plane address replaced to the PDN gateway; and/or, obtains a management message that carries the access network control plane address and is sent by the PDN gateway, converts the access network control plane address in the management message into the core network control plane address, and sends the management message with the control plane address replaced to the SGSN.

In the communication system according to this embodiment, the data is directly routed between the Home NodeB, the Home NodeB gateway or the macro network access network and the PDN gateway through the tunnel between the access network and the PDN gateway, which shortens the transmission delay of data and ensures the Quality of Service of transmission. After the access network unload function is enabled, the user equipment is switched into an idle state, so that the core network bearer enters a normal user equipment idle state route, which ensures idle state downlink data routing and paging. When the user equipment is switched into the idle state, the tunnel between the SGSN and the PDN gateway is recovered, and the downlink data is buffered in the PDN gateway, so that the normal paging function is ensured while the backhaul pressure of an operator network is alleviated. The PDN gateway sends the indication information of triggering the paging, so that the serving gateway sends a paging message to the user equipment according to the indication information, to trigger an establishment request of wireless bearer between the serving gateway and the data network, and realize direct routing of a user plane between the PDN gateway and the access network where the user equipment is located, and the buffer data is directly sent to the access network from the PDN gateway, Thereby, the pressure on a bearer network caused by transmission of the downlink data through the serving gateway is alleviated and the delay is reduced. The Home NodeB gateway converts the control plane address of the message, so as to realize direct communication among different address domains, and thereby realize management of the tunnel between the PDN gateway and the access network.

Persons of ordinary skill in the art can understand that all or a part of the steps of the method according to the embodiments of the present invention may be implemented by a program instructing relevant hardware. The program may be stored in a computer readable storage medium. When the program is run, one or a combination of the steps in the method embodiments of the present invention are included.

In addition, the functional units in each embodiment of the present invention may be integrated in one processing module, or each unit physically exists separately, or two or more units are integrated in one processing module. The integrated module may be embodied in the form of hardware or a software functional module. If the integrated module is embodied in the form of a software functional module and is sold or used as a independent product, the integrated module may also be stored in a computer readable storage medium.

The storage medium may be a Read-Only Memory, a magnetic disk, or an optical disk.

The above descriptions are merely specific embodiments of the present invention, but not intended to limit the scope of the present invention. Any modification and replacement easily figured out by those skilled in the art within the technical scope of the present invention shall fall within the protection scope of the present invention. Therefore, the protection scope of the present invention is subject to the appended claims.

What is claimed is:

1. A method for routing user plane data in a mobile network, comprising:
   establishing a tunnel between an access network and a packet data network (PDN) gateway to interconnect an access network bearer of a user equipment and a PDN gateway bearer of the user equipment;
   routing data between a Home NodeB of the access network and the PDN gateway through the tunnel;
   wherein the establishing the tunnel between the access network and the PDN gateway to interconnect the access network bearer of the user equipment and the PDN gateway bearer of the user equipment comprises:
   receiving, by the access network, a tunnel endpoint identifier of the PDN gateway, wherein the tunnel endpoint identifier of the PDN gateway is sent by a mobility management entity (MME) or a serving GPRS support node (SGSN), and establishing an uplink tunnel corresponding to the tunnel endpoint identifier of the PDN gateway according to the tunnel endpoint identifier of the PDN gateway, so that the access network bearer of the user equipment and the PDN gateway bearer of the user equipment are directly interconnected;
   further comprising:
   receiving, by the access network, a user plane uplink address of the PDN gateway, wherein the user plane uplink address of the PDN gateway is sent by the MME or the SGSN, so that the access network establishes an uplink tunnel corresponding to the user plane uplink address of the PDN gateway and the tunnel endpoint identifier of the PDN gateway according to the user plane uplink address of the PDN gateway and the tunnel endpoint identifier of the PDN gateway; and
   receiving, by the PDN gateway, a user plane downlink address of the access network, wherein the user plane downlink address is sent by a serving gateway (SGW), so that the PDN gateway establishes a downlink tunnel corresponding to the user plane downlink address of the access network and a tunnel endpoint identifier of the access network according to the user plane uplink address of the access network and the tunnel endpoint identifier of the access network.

2. The method according to claim 1, further comprising:
   obtaining, by the SGW, access network unload enabling information;
   determining, by the SGW, whether an access network unload function is enabled according to the access network unload enabling information; and
   performing, by the SGW, at least one of the following steps:
   sending, by the SGW, the tunnel endpoint identifier of the PDN gateway to the access network if the access network unload function is enabled, so as to establish the uplink tunnel corresponding to the tunnel endpoint identifier of the PDN gateway; and
   sending, by the SGW, the tunnel endpoint identifier of the access network to the PDN gateway if the access network unload function is enabled, so as to establish the uplink tunnel corresponding to the tunnel endpoint identifier of the PDN gateway.

3. The method according to claim 1, wherein after the establishing the uplink tunnel corresponding to the identifier of the access network bearer, the method further comprises:
   updating the uplink tunnel corresponding to the identifier of the access network bearer, wherein the downlink tunnel is deployed between the access network of the user equipment and the PDN gateway of the user equipment.

4. The method according to claim 1, wherein before the establishing the tunnel between the access network and the PDN gateway, the method further comprises:
   sending, by the PDN gateway, trigger paging indication information to the SGW, wherein the trigger paging indication information indicates that downlink data arrives, so that the SGW sends a paging message to the user equipment according to the trigger paging indication information, to instruct the user equipment to initiate establishing the tunnel between the access network and the PDN gateway.

5. The method according to claim 4, wherein before the sending, by the PDN gateway, the trigger paging indication information, the method further comprises:
   obtaining, by the PDN gateway, a connection state of the tunnel, determining to buffer the downlink data according to the connection state, and buffering the downlink data when the access network and the PDN gateway are integrated together.

6. The method according to claim 4, wherein the trigger paging indication information is at least one data packet in the downlink data or an empty packet carrying discarding indication information or a downlink data notification.

7. The method according to claim 1, wherein when the PDN gateway, a Home NodeB gateway, and the access network are integrated together, after the establishing the tunnel between the access network and the PDN gateway, the method further comprises at least one of the following steps:
   obtaining, by the Home NodeB gateway, a management message carrying a core network control plane address sent by the serving gateway or the serving GPRS support node wherein the management message is used for managing the tunnel, converting the core network control plane address in the management message into an access network control plane address, and sending the management message with the access network control plane address to the PDN gateway;
   obtaining a management message carrying the access network control plane address sent by the PDN gateway, wherein the management message is used for managing the tunnel, converting the access network control plane address in the management message into the core network control plane address, and sending the management message with the core network control plane address to the serving gateway.

* * * * *